United States Patent
Omote et al.

(10) Patent No.: US 7,490,149 B2
(45) Date of Patent: Feb. 10, 2009

(54) SECURITY MANAGEMENT APPARATUS, SECURITY MANAGEMENT SYSTEM, SECURITY MANAGEMENT METHOD, AND SECURITY MANAGEMENT PROGRAM

(75) Inventors: Kazumasa Omote, Kawasaki (JP); Satoru Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1083 days.

(21) Appl. No.: 10/729,992

(22) Filed: Dec. 9, 2003

(65) Prior Publication Data
US 2004/0168085 A1 Aug. 26, 2004

(30) Foreign Application Priority Data
Feb. 24, 2003 (JP) ............... 2003-046251

(51) Int. Cl.
G06F 15/173 (2006.01)
G06F 15/16 (2006.01)
H04L 9/32 (2006.01)

(52) U.S. Cl. .............. 709/224; 709/222; 726/3
(58) Field of Classification Search ............. None
See application file for complete search history.

(56) References Cited

U.S. PATENT DOCUMENTS

| | | | |
|---|---|---|---|
| 5,931,946 A * | 8/1999 | Terada et al. ........... | 726/25 |
| 6,189,102 B1 * | 2/2001 | Beser ............. | 726/2 |
| 6,351,773 B1 * | 2/2002 | Fijolek et al. ......... | 709/228 |
| 6,587,874 B1 * | 7/2003 | Golla et al. ........... | 709/220 |
| 6,792,474 B1 * | 9/2004 | Hopprich et al. ....... | 709/245 |
| 6,920,506 B2 * | 7/2005 | Barnard et al. ......... | 709/245 |
| 7,013,462 B2 * | 3/2006 | Zara et al. ........... | 717/177 |
| 7,340,776 B2 * | 3/2008 | Zobel et al. .......... | 726/24 |
| 2002/0133606 A1 * | 9/2002 | Mitomo et al. ......... | 709/229 |

FOREIGN PATENT DOCUMENTS

| | | |
|---|---|---|
| JP | 11-327897 | 11/1999 |
| JP | 2000-250743 | 9/2000 |
| JP | 2002-055839 | 2/2002 |
| JP | 2002-55839 | 2/2002 |
| JP | 2002-318707 | 10/2002 |

OTHER PUBLICATIONS

Office Action mailed Sep. 16, 2008 in the corresponding Japanese Patent Application No. 2003-046251 (5 pages).

* cited by examiner

*Primary Examiner*—John B. Walsh
(74) *Attorney, Agent, or Firm*—Staas & Halsey LLP

(57) ABSTRACT

A security management apparatus is capable of taking various security measures while referencing machine information and hence excellent in flexibility and widely applicable. The apparatus includes a security diagnostic unit for making a security diagnosis on the basis of security information obtained from a security information providing apparatus for providing information concerning security in a network and further on the basis of machine information obtained from at least one network machine connected to a network to judge a type of security-related processing to be executed for the network machine and also judge whether or not the security-related processing needs to be executed. A security execution unit executes predetermined security measure processing for the network machine on the basis of a result of diagnosis made by the security diagnostic unit.

4 Claims, 19 Drawing Sheets

```
[SERVER_NAME]
srv01
[ARCHITECTURE]
sparc
[OS_VERSION]
5.8
[HARDWARE]
SUNW,SPARCstation-20
[INSTALL_PACKAGE]
SUNWadmap
SUNWftpr
SUNWftpu
:
[APPLY_PATCH]
109134-10
109134-27
109618-01
:
[END]
```

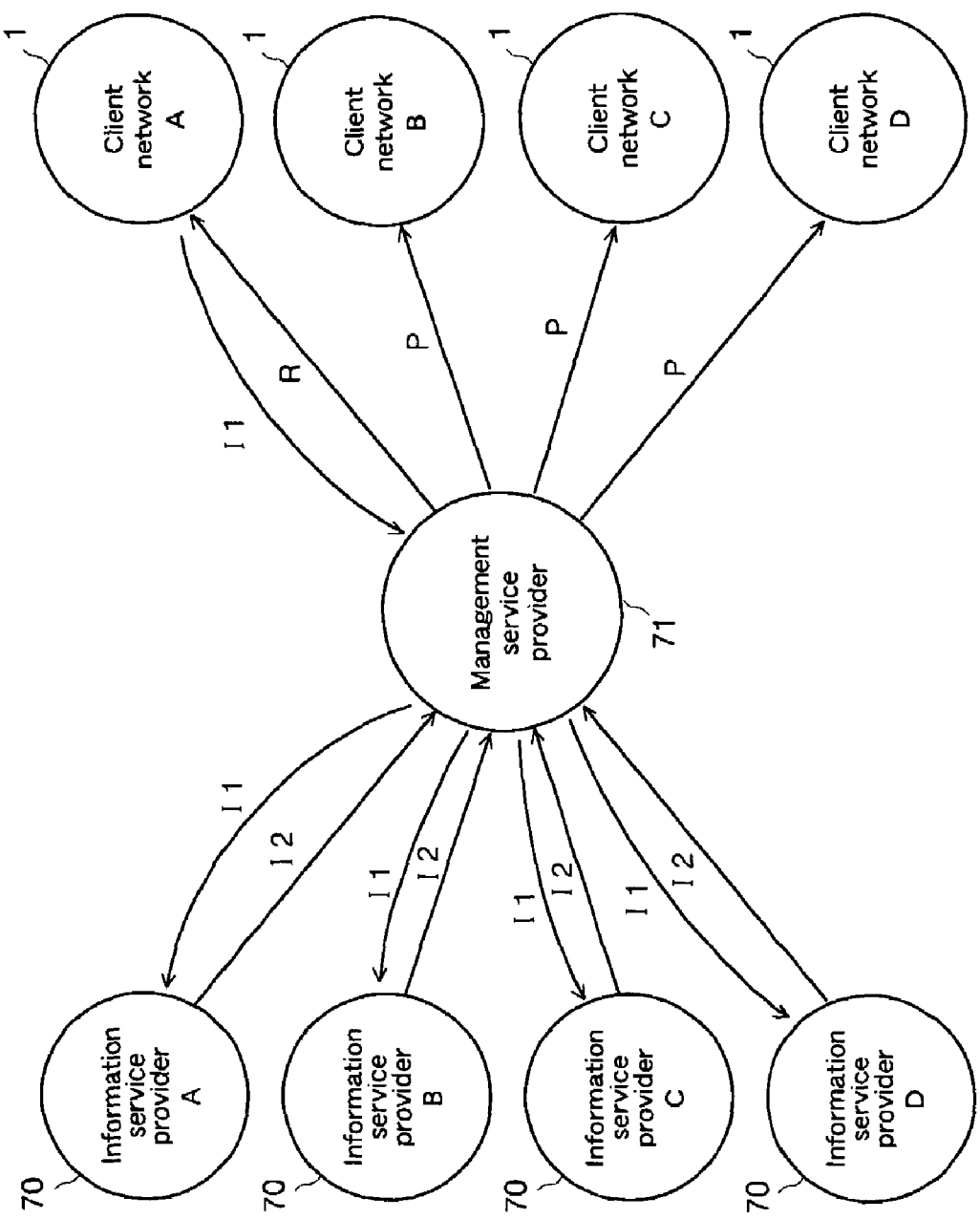

SECURITY MANAGEMENT APPARATUS, SECURITY MANAGEMENT SYSTEM, SECURITY MANAGEMENT METHOD, AND SECURITY MANAGEMENT PROGRAM

BACKGROUND OF THE INVENTION

1. Field of the Invention

The present invention relates to a security management apparatus, a security management system, a security management method, and a security management program that are capable of eliminating dangers of causing abnormality in a network system, such as unauthorized access.

2. Description of the Related Art

As techniques for security management services, the following have heretofore been known, by way of example.

A first conventional technique comprises a client machine to which a patch is applicable, and a server computer holding patch data and software data for the client machine. The server computer applies a patch to the client computer [for example, see Japanese Patent Application Unexamined Publication (KOKAI) Nos. 2002-55839 and 2000-250743].

The operation of the prior art is as follows. (1) First, software information concerning the client computer is registered in the server computer. (2) Next, information concerning software to be updated and software depending thereon is registered in the server computer. (3) Then, it is judged whether or not to make software updating for the client computer, and (4) a patch is distributed to the client computer from the server computer.

According to a second conventional technique, a monitoring server remotely executes virus checking for a monitored client and receives the result of the execution. If a virus is detected, the monitoring server notifies the monitored client of the detection of the virus [for example, see Japanese Patent Application Unexamined Publication (KOKAI) No. Hei 11-327897].

The operation of the second prior art is as follows. (1) First, the monitoring server checks whether virus checking has been executed or not for the monitored clients. (2) The monitoring server requests execution of virus checking for a monitored client that has not been subjected to virus checking. (3) The monitoring server receives the result of the execution. (4) The monitoring server notifies the monitored client whether or not a virus has been detected.

However, the first conventional technique lacks the function of selectively obtaining various security information open to the public on the Web according to machine information and is therefore inferior in flexibility in terms of security measures. Accordingly, this technique is difficult to apply to a wide range of uses. Similarly, the second conventional technique is limited only to virus checking and incapable of taking various security measures according to machine information.

It should be noted that the present applicant proposed a technique in which a filtering rule is created for a security hole for which a patch has not yet been open to the public, to protect the security hole by the filter until a patch is open to the public, and the rule is deleted when a patch is open to the public. This technique also lacks the function of obtaining machine information concerning a network machine and creating a rule in conformity to the machine and is therefore inferior in applicability. That is, it cannot offer wide applicability.

SUMMARY OF THE INVENTION

The present invention was made in view of the above-described problems with the prior art.

Accordingly, an object of the present invention is to provide a security management apparatus, a security management system, a security management method, and a security management program that are capable of obtaining machine information from network machines constituting a network and of taking various security measures while referencing the machine information and hence excellent in flexibility and widely applicable.

The present invention provides a security management apparatus including a security diagnostic unit for making a security diagnosis on the basis of security information obtained from a security information providing unit for providing information concerning security in a network and further on the basis of machine information obtained from at least one network machine connected to a network to judge a type of security-related processing to be executed for the network machine or a predetermined network including the network machine and also judge whether or not the security-related processing needs to be executed. The apparatus further includes a security execution unit for executing predetermined security measure processing for the network machine or the predetermined network including the network machine on the basis of a result of diagnosis made by the security diagnostic unit.

In the security management apparatus according to the present invention, the security diagnostic unit preferably further uses machine-related information obtained from a machine-related information storage unit containing predetermined information about network machines that are connected to the network or may be connected to the network to judge a type of security-related processing to be executed for the network machine or the predetermined network including the network machine and also judge whether or not the security-related processing needs to be executed.

In the security management apparatus according to the present invention, the machine-related information stored in the machine-related information storage unit is preferably information specifying a security policy.

The security management apparatus according to the present invention may be arranged as follows. The security policy specifies filtering protection or communication control with regard to predetermined machine information, and the security execution unit executes filtering processing or communication control.

Further, the security management apparatus according to the present invention may be arranged as follows. The security policy specifies patch application or vaccine administration with regard to a predetermined program, and the security execution unit executes patch application processing or vaccine administration processing for the predetermined program.

Further, the security management apparatus according to the present invention may be arranged as follows. When the security measure processing has been executed by the security execution unit, operation confirmation is made to the network machine or the predetermined network for a result of execution of the security measure processing.

Further, the security management apparatus according to the present invention may be arranged as follows. When the security measure processing has been executed by the security execution unit, a filtering rule is deleted if it has been set for the security target.

Further, the security management apparatus according to the present invention may further include a connection request accepting unit for accepting a connection request from a newly introduced network machine. When the connection request accepting unit accepts a connection request from a newly introduced network machine, the security diagnostic unit assigns an address to the newly introduced network machine after placing it in an isolated state and judges whether or not to execute processing for unisolating the newly introduced network machine as the security-related processing on the basis of the machine information and the security information.

The security management apparatus according to the present invention may further include a connection request accepting unit for accepting a connection request from a newly introduced network machine. When the connection request accepting unit accepts a connection request from a newly introduced network machine, the security diagnostic unit receives machine information from the newly introduced network machine and judges whether or not to execute processing for assigning an address to the newly introduced network machine as the security-related processing on the basis of the machine information and the security information.

In addition, the present invention provides a security management apparatus including a security diagnostic unit for making a security diagnosis on the basis of machine information obtained from at least one network machine connected to a network and further on the basis of machine-related information obtained from a machine-related information storage unit containing predetermined information about network machines that are connected to the network or may be connected to the network to judge a type of security-related processing to be executed for the network machine or a predetermined network including the network machine and also judge whether or not the security-related processing needs to be executed. The apparatus further includes a security execution unit for executing predetermined security measure processing for the network machine or the predetermined network including the network machine on the basis of a result of diagnosis made by the security diagnostic unit.

The security management apparatus according to the present invention may be arranged as follows. The machine-related information includes information indicating the behavior of computer viruses, and the machine information includes at least either one of a hash value of a predetermined file and a virus scan result. The security diagnostic unit judges whether or not a predetermined network machine needs to be isolated, and the security execution unit executes processing for isolating the network machine when the security diagnostic unit judges that the network machine needs to be isolated.

The security management apparatus according to the present invention may be arranged as follows. The apparatus further includes a network monitor for monitoring communications on the network machines. The machine-related information is information concerning a network machine profile. The security diagnostic unit judges whether or not a predetermined network machine needs to be isolated on the basis of monitor information obtained from the network monitor and the machine information and further the network machine profile information. The security execution unit executes processing for isolating the network machine when the security diagnostic unit judges that the network machine needs to be isolated.

In the security management apparatus according to the present invention, the security diagnostic unit may identify a range of damage and determine a range of isolation.

The security management apparatus according to the present invention may further include a recovery unit for repairing a network machine or network having received predetermined damage on the basis of a result of diagnosis made by the security diagnostic unit.

The security management apparatus according to the present invention may further include an unisolating unit for canceling isolation when damage repair has been made.

Further, the security management apparatus according to the present invention may be arranged as follows. The machine information includes a notice of a change in equipment configuration and at least information concerning the equipment configuration that may be changed, and the machine-related information includes equipment configuration information specifying whether or not the network machine is usable in the network.

Further, the security management apparatus according to the present invention is preferably arranged as follows. The security diagnostic unit judges whether or not the network machine needs to be isolated, and the security execution unit executes processing for isolating the network machine on the basis of a result of judgment made by the security diagnostic unit.

In addition, the present invention provides a security management system including a security information providing apparatus for providing security information concerning security in a network, and a machine-related information database containing predetermined information about network machines that are connected to the network or may be connected to the network. A preventive system judges whether or not there is damage to at least one network machine connected to a network or damage to a predetermined network including the network machine or whether or not preventive measures need to be executed for the network machine or the predetermined network on the basis of security information obtained from the security information providing apparatus and machine-related information obtained from the machine-related information database and further machine information obtained from the network machine. A recovery system executes recovery processing when there is predetermined damage, or takes preventive measures on the basis of judgment made by the preventive system.

The security management system according to the present invention may be arranged as follows. A plurality of preventive systems or a plurality of recovery systems are provided, and a management center for generally managing these systems is provided.

The security management system according to the present invention may be arranged as follows. A plurality of preventive systems or a plurality of recovery systems are provided, and information obtained by these systems is shared among them.

In the security management system according to the present invention, the preventive system and the recovery system may be provided on the side of an owner of the security information providing apparatus.

Further, the security management system according to the present invention may be arranged as follows. The preventive system is provided on the side of an owner of the security information providing apparatus, and the recovery system is provided on the side of a management service provider who provides management services.

In the security management system according to the present invention, the preventive system and the recovery system may be provided on the side of a management service provider who provides management services.

Further, the security management system according to the present invention may be arranged such that predetermined information obtained by the recovery system is fed back to the preventive system as new security information.

In addition, the present invention provides a security management method including the step of obtaining security information concerning security in a network, and the step of obtaining machine information from at least one network machine connected to a network. The method further includes the step of making a security diagnosis on the basis of the security information and the machine information to judge a type of security-related processing to be executed for the network machine or a predetermined network including the network machine and also judge whether or not the security-related processing needs to be executed, and the step of executing predetermined security measure processing for the network machine or the predetermined network including the network machine on the basis of a result of diagnosis made by the security diagnostic step.

Preferably, the security management method according to the present invention further includes the step of obtaining machine-related information from a machine-related information storage unit containing predetermined information about network machines that are connected to the network or may be connected to the network. The security diagnostic step makes the security diagnosis on the basis of the machine-related information as well as the security information and the machine information.

In addition, the present invention provides a security management method including the step of obtaining machine information from at least one network machine connected to a network, and the step of obtaining machine-related information from a machine-related information storage unit containing predetermined information about network machines that are connected to the network or may be connected to the network. The method further includes the step of making a security diagnosis on the basis of the machine information and the machine-related information to judge a type of security-related processing to be executed for the network machine or a predetermined network including the network machine and also judge whether or not the security-related processing needs to be executed, and the step of executing predetermined security measure processing for the network machine or the predetermined network including the network machine on the basis of a result of diagnosis made by the security diagnostic step.

In addition, the present invention provides a security management program for instructing a computer to execute security management. The program includes the step of obtaining security information concerning security in a network, and the step of obtaining machine information from at least one network machine connected to a network. The program further includes the step of making a security diagnosis on the basis of the security information and the machine information to judge a type of security-related processing to be executed for the network machine or a predetermined network including the network machine and also judge whether or not the security-related processing needs to be executed, and the step of executing predetermined security measure processing for the network machine or the predetermined network including the network machine on the basis of a result of diagnosis made by the security diagnostic step.

Preferably, the security management program according to the present invention further includes the step of obtaining machine-related information from a machine-related information storage unit containing predetermined information about network machines that are connected to the network or may be connected to the network. The security diagnostic step makes the security diagnosis on the basis of the machine-related information as well as the security information and the machine information.

In addition, the present invention provides a security management program for instructing a computer to execute security management. The program includes the step of obtaining machine information from at least one network machine connected to a network, and the step of obtaining machine-related information from a machine-related information storage unit containing predetermined information about network machines that are connected to the network or may be connected to the network. The program further includes the step of making a security diagnosis on the basis of the machine information and the machine-related information to judge a type of security-related processing to be executed for the network machine or a predetermined network including the network machine and also judge whether or not the security-related processing needs to be executed, and the step of executing predetermined security measure processing for the network machine or the predetermined network including the network machine on the basis of a result of diagnosis made by the security diagnostic step.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 21 is a diagram showing a fourth example of assignment configuration of various systems as a tenth embodiment of the present invention.

DETAILED DESCRIPTION OF THE PREFERRED EMBODIMENTS

Embodiments of the present invention will be described below with reference to the accompanying drawings.

Figure 1:
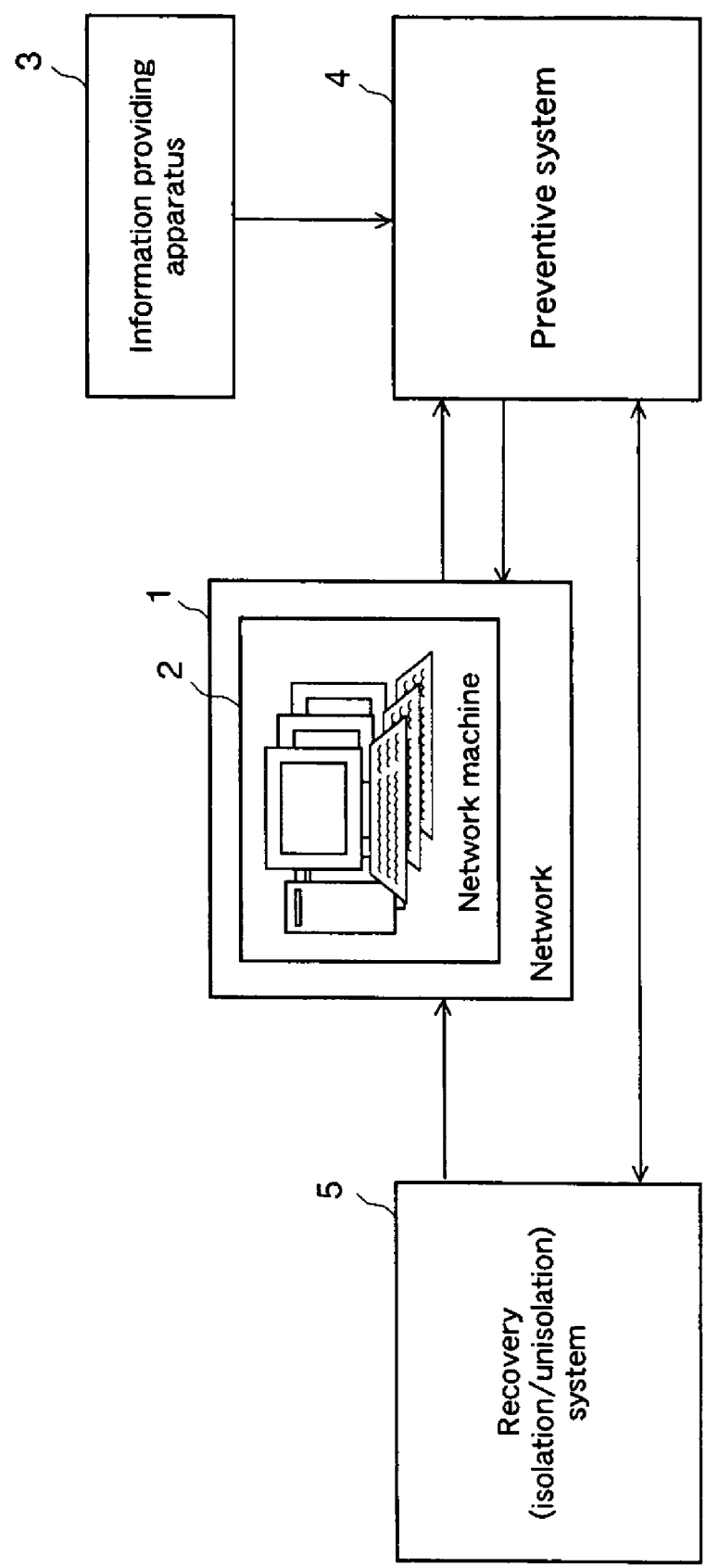
FIG. 1 is a block diagram basically showing the general arrangement of a security management system according to an embodiment of the present invention.
Figure 2:
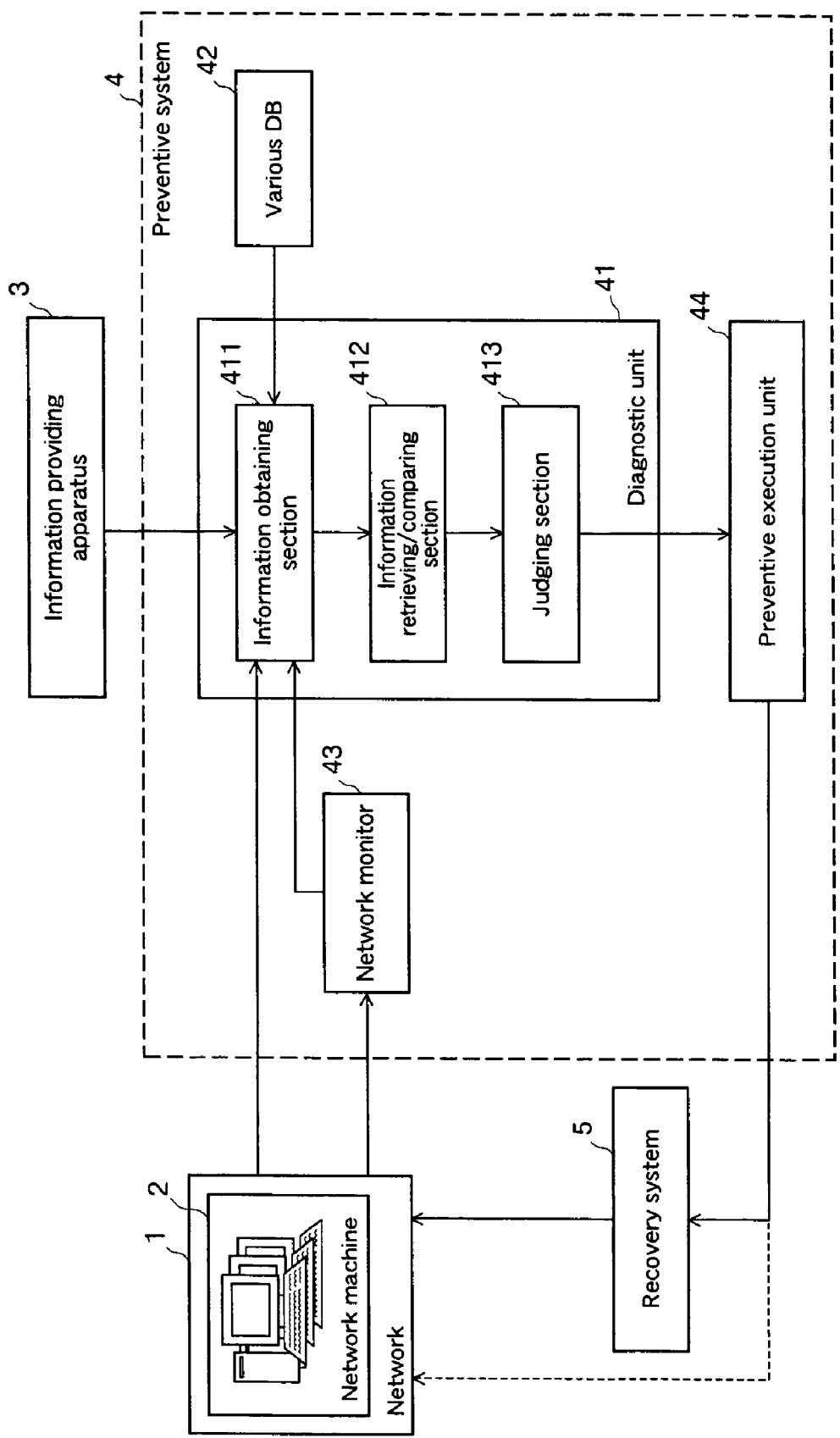
FIG. 2 is a block diagram showing the general arrangement of an embodiment of the present invention.

FIG. 1 is a block diagram basically showing the general arrangement of a security management system according to an embodiment of the present invention. FIG. 2 is a block diagram showing the general arrangement of a preventive system in more detail. In this embodiment, the security management system includes network machines 2 interconnected in a network 1 to constitute networks. An information providing apparatus 3 provides various information. A preventive system 4 takes security measures for the network machines 2 in the network 1 (see FIG. 4). A recovery system 5 isolates or unisolates the network 1 or network machines 2, for example, to execute a part of the security measures in cooperation with the preventive system 4. Further, when the network 1 or network machines 2 are damaged, the recovery system 5 restores them.

It should be noted that the information providing apparatus 3, the preventive system 4 and the recovery system 5 shown in FIG. 1 are interconnectable through Internet or other communications circuit in the same way as the network machines 2. Further, each system has a computer (e.g. a PC) capable of performing various decision-making operations and processing operations such as those usually required.

Here, the network machines 2 are assumed to be DNS (Domain Name System) servers or mail servers, by way of example. The information providing apparatus 3 is assumed to open security hole information, patch-related information, etc. to the public on a Web page without charge. The information providing apparatus 3 is also assumed to open information to the public in the same way as in the past and perform encrypted communication according to need. Further, introducing the preventive system 4 and the recovery system 5 into a conventional system makes it possible to initiate services by the security management system. To introduce them, the preventive system 4 and the recovery system 5 may be purchased or rented.

The preventive system 4 has, as shown in FIG. 2, a diagnostic unit (security diagnostic unit) 41 for judging the type of security-related processing to be executed and also judging whether or not the security-related processing needs to be executed. The preventive system 4 further has various databases 42 and a network monitor 43 for monitoring the condition of the network 1 including the network machines 2. A preventive execution unit 44 instructs the recovery system 5 to take preventive measures, for example, on the basis of the result of diagnosis made by the diagnostic unit 41.

The diagnostic unit 41 includes an information obtaining section 411 for obtaining information from the network machines 2, the information providing apparatus 3, the various databases 42, and the network monitor 43 according to need. An information retrieving/comparing section 412 retrieves or compares information obtained by the information obtaining section 411. A judging section 413 judges the type of security-related processing to be executed and also judges whether or not the security-related processing needs to be executed.

With these arrangements defined as basic arrangements, various operations will be described below in correspondence to embodiments of the present invention. It should be noted that the preventive system in each embodiment corresponds to the security management apparatus according to the present invention.

First Embodiment

Figure 3:
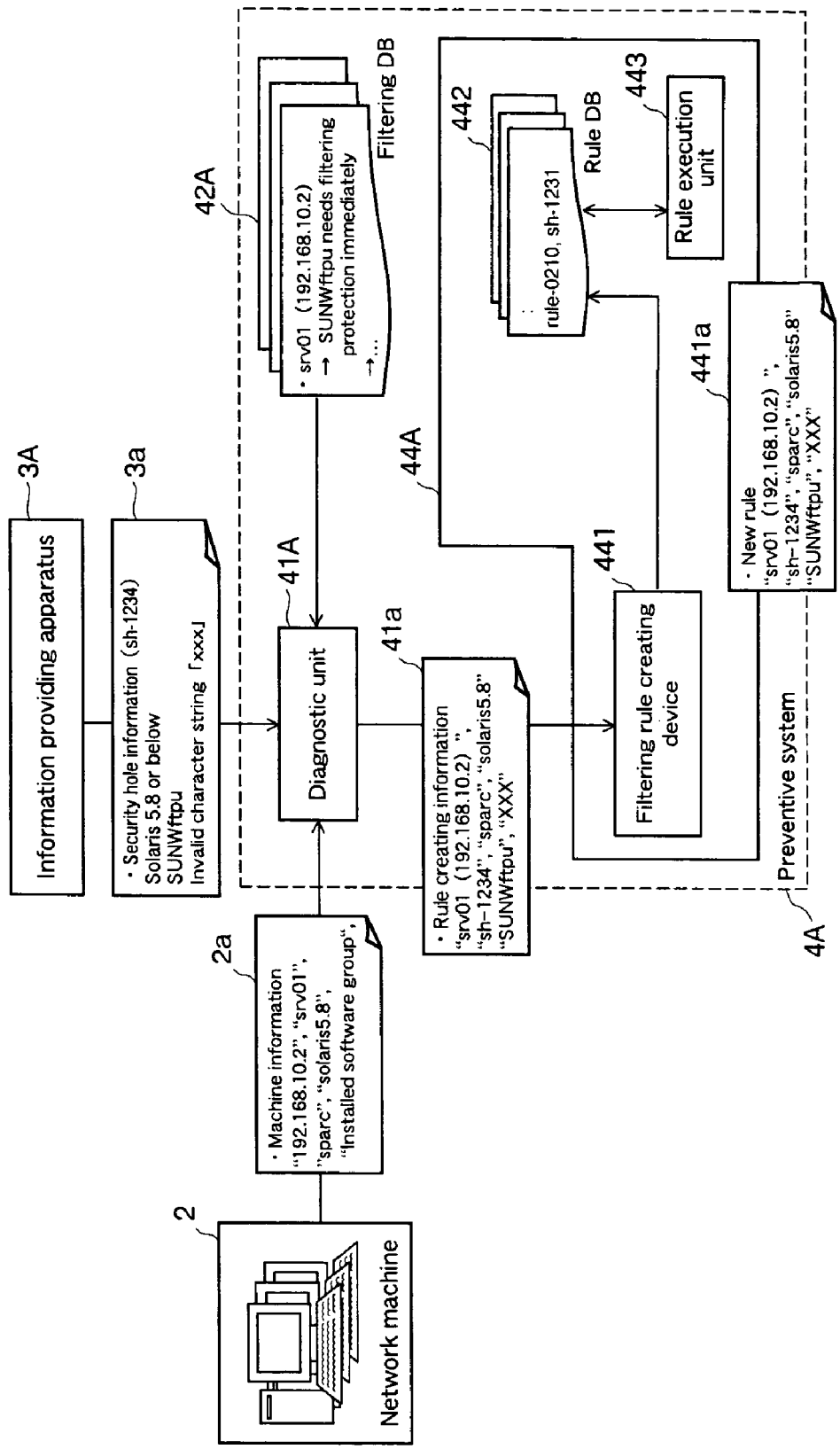
FIG. 3 is a block diagram showing a first embodiment of the present invention.
Figure 4:
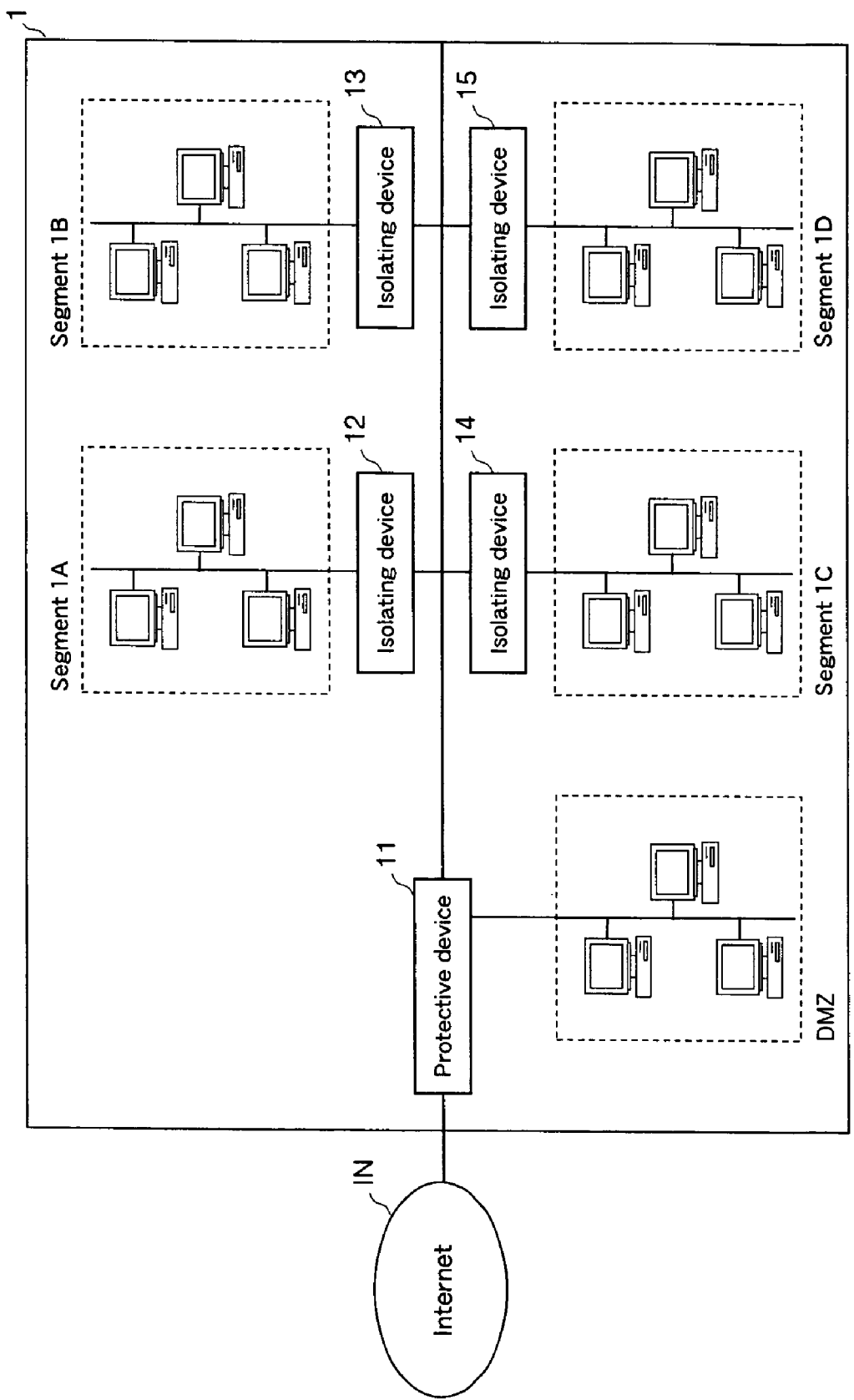
FIG. 4 is a block diagram showing a network in which security management is implemented.
Figure 5:
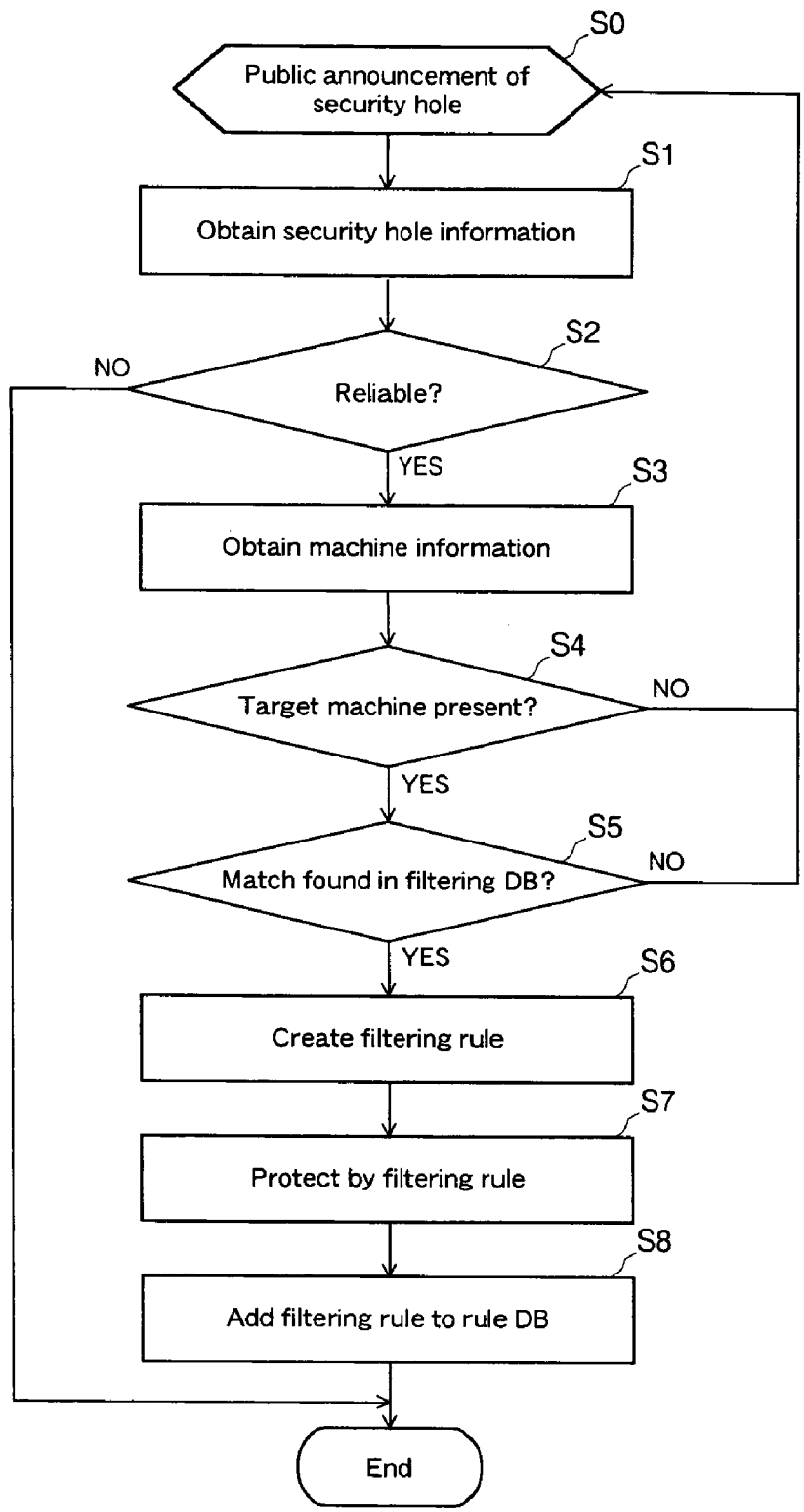
FIG. 5 is a flowchart showing the operation of the first embodiment.

FIG. 3 is a block diagram showing a first embodiment of the present invention. FIG. 4 is a block diagram showing a network in which security management is implemented. FIG. 5 is a flowchart showing the operation of the first embodiment.

The first embodiment will be described with regard to an example in which security measures are taken on the basis of security hole information opened to the public by the information providing apparatus 3.

When security hole information including those not yet made public is opened to the public by the information providing apparatus 3A (step S0), the information obtaining section 411 (see FIG. 2) of the preventive system 4A downloads security hole information (security hole number, target OS name, target services, vulnerability content, etc.) 3*a* from the information providing apparatus 3A (step S1) and verifies whether or not the relevant security information is correct (step S2). The information obtaining section 411 obtains only correct information (if YES at step S2).

Verification as to whether or not the security information is correct is made on the basis of the authenticity of the information itself, for example. More specifically, information sources have previously been classified into some levels of reliability, and information from a source considered to be of higher reliability than a predetermined level is used. Reliability can also be checked actually by using an experimental tool. For example, a Web server is experimentally started in advance, and a condition including a specific character string and instruction and corresponding to the security hole information is created to perform verification. Alternatively, verification may be performed by checking the correctness of the information itself (as to whether or not the information has been tampered. For example, the correctness of the information may be checked by verifying an electronic signature added to the information or by verifying the added hash value.

Figures 17, 18:
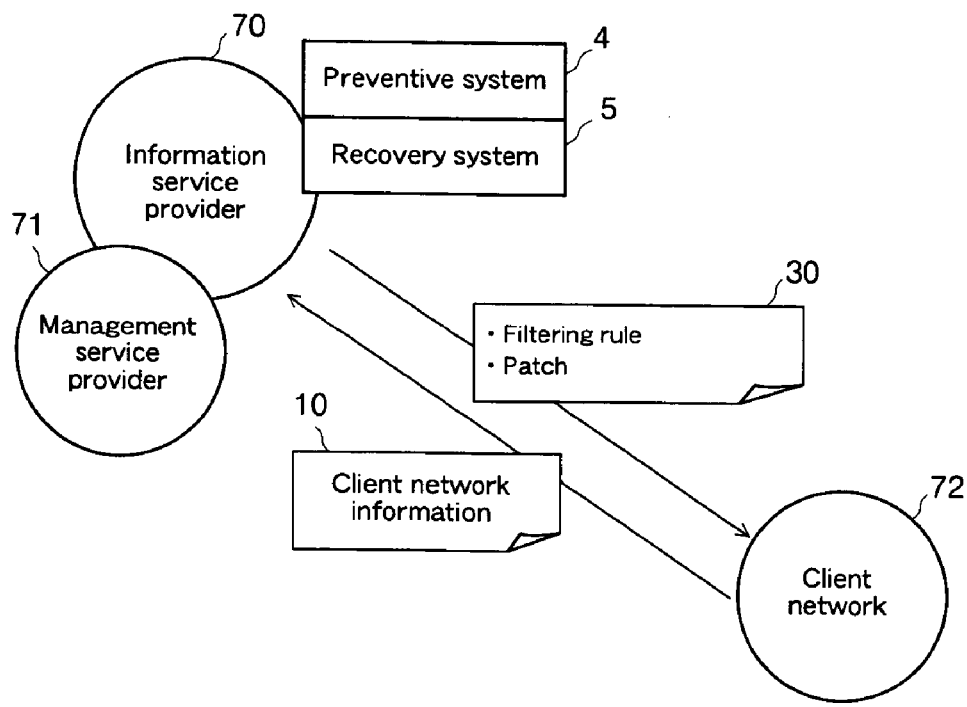
FIG. 17 is a diagram showing an example of machine information in an embodiment of the present invention.
FIG. 18 is a diagram showing a first example of assignment configuration of various systems as a seventh embodiment of the present invention.

The preventive system 4A (diagnostic unit 41A) obtains machine information (machine name, IP address, architecture name, OS name, installed package group, etc.) 2*a* in the network 1 (step S3), and compares the obtained machine information with the correct security information concerned to judge the presence of a machine having a security hole. If such a machine is present, the machine is selected (step S4). It should be noted that an example of machine information is shown in FIG. 17. Next, if the information from the information providing apparatus 3 includes information indicating that the relevant security hole is of high emergency level, this information is taken into consideration, and a filtering database 42A is immediately referenced among the various databases 42 to judge whether or not it contains information specifying the implementation of filtering protection (i.e.

whether or not the information matches a registered item in the filtering database) (step S5). If it is judged that the machine needs to be protected, machine information concerning the machine to be protected and vulnerability content are transmitted to a filtering rule creating device 441. The filtering database 42A is a database specifying a security policy regarding the setting of a filtering rule. It should be noted that if the creation of a filtering rule requires a time longer than a predetermined period of time, the preventive system 4A can instruct the relevant machine to halt software that may be a vulnerability target for the time being.

Then, the filtering rule creating device 441 creates a new filtering rule 441a including a rule number and a corresponding security hole number (step S6), and a rule execution unit 443 protects the security hole from attacks by the rule (step S7). Further, the filtering rule creating device 441 registers the created new rule into a rule database 442 (step S8). The filtering rule creating device 441 in this embodiment creates a new rule to prevent transmission of information representing an invalid character string "xxx" to the software "SUN-Wftpu" installed in a network machine applicable to the security hole information 3a, and registers the new rule into the rule database 442.

Thus, the rule execution unit 443 prevents such information from reaching the relevant network machine on the basis of the rule registered in the rule database 442. In this case, the recovery system 5 (FIG. 2) is instructed from the rule execution unit 443 to activate a protective device 11 in the network shown in FIG. 4, for example, to cut off the transmission of the invalid character string when sent externally to the network machine for which the rule has been set. It should be noted that the network shown in FIG. 4 is divided into a plurality of network segments 1A to 1D through isolating devices 12 to 15. The protective device 11 (firewall) is provided at the entrance to the network. In addition, a DMZ (De-Militarized Zone) is constructed, which is connectable with the Internet IN through the protective device 11.

In the foregoing first embodiment, the creation of a filtering rule has been described as an example of the type of security-related processing. However, for network machines that operate as communications equipment, rules for communication control may be created and set. Examples of the communication control are flow control of incoming communication data, calling control, and change of routing information.

It should be noted that in the first embodiment the filtering rule creating system 441, the rule database 442 and the rule execution unit 443 constitute in combination the preventive execution unit 44 shown in FIG. 2.

Second Embodiment

Figure 6:
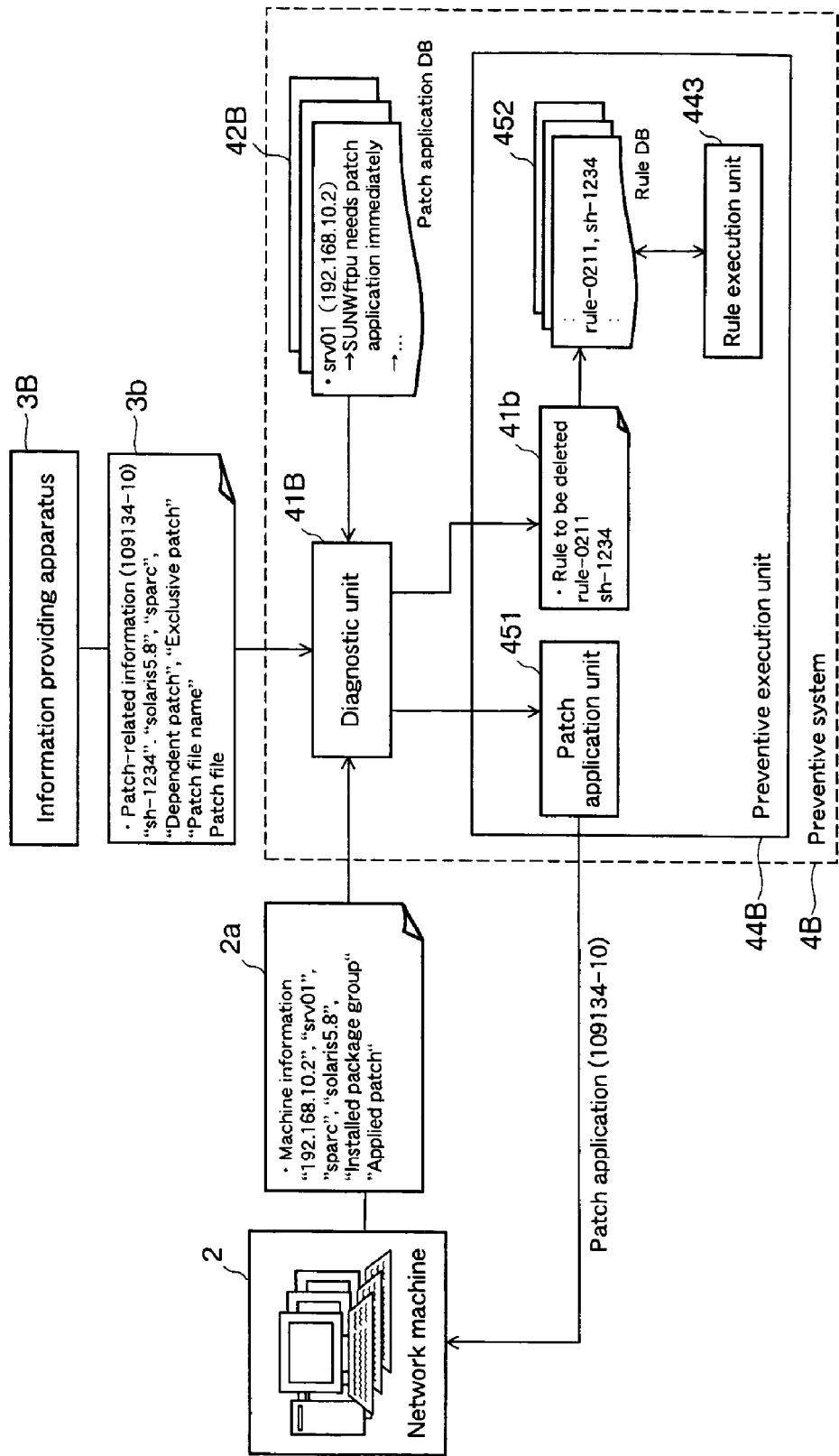
FIG. 6 is a block diagram showing a second embodiment of the present invention.
Figure 7:
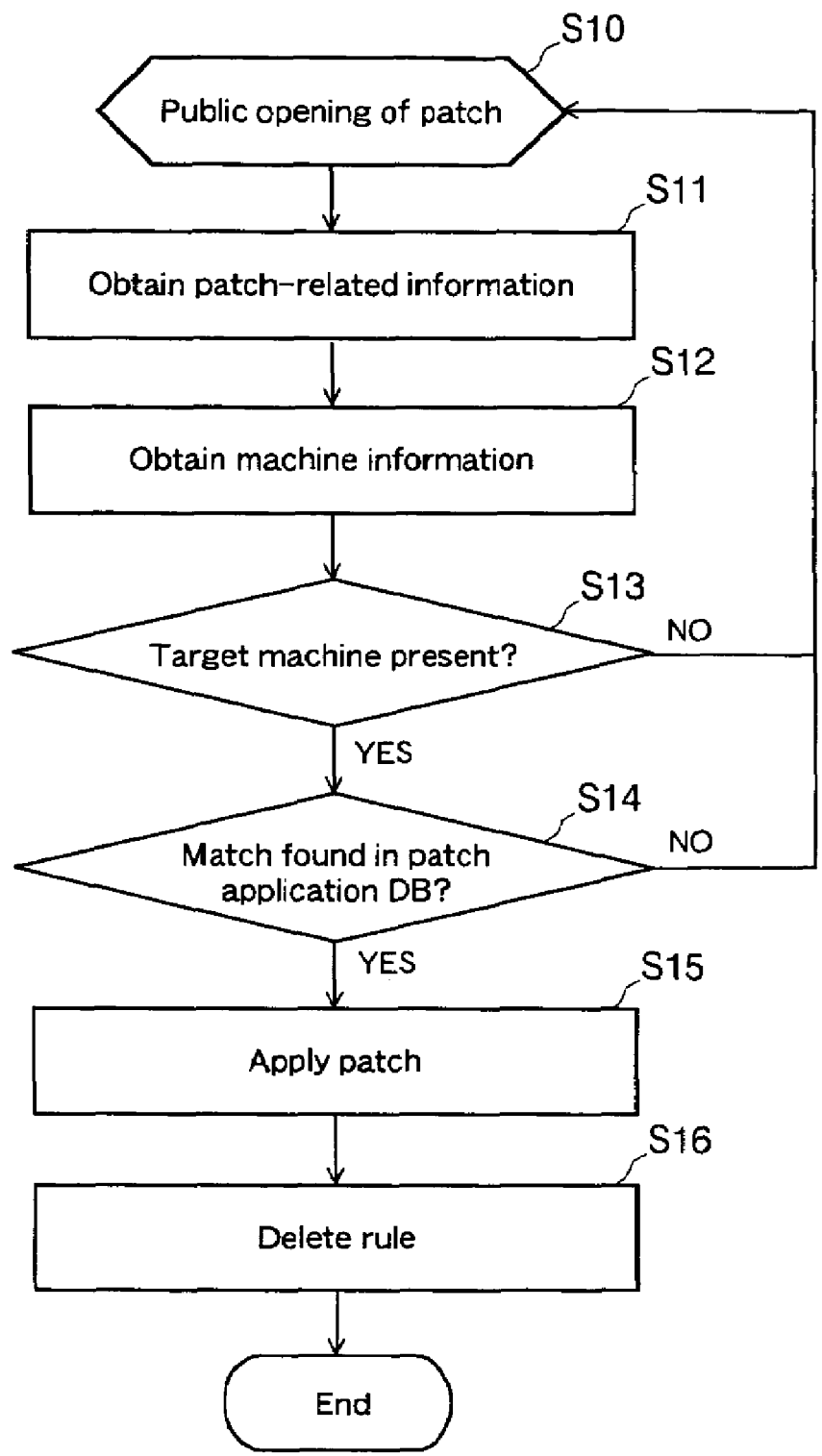
FIG. 7 is a flowchart showing the operation of the second embodiment of the present invention.

FIG. 6 is a block diagram showing a second embodiment of the present invention. FIG. 7 is a flowchart showing the operation of the second embodiment.

In the following second embodiment, security measures are taken on the basis of patch-related information opened to the public by the information providing apparatus.

When a new patch is opened from the information providing apparatus 3B (step S10), the diagnostic unit 41B of the preventive system 4B downloads the relevant patch file and information related to the patch (target security hole number, architecture name, target OS name, and target services) 3b from the information providing apparatus 3B (step S11) and obtains machine information (machine name, IP address, architecture name, OS name, installed package group, already-applied patch group, etc.) 2b from the network machines 2 (step S12). Then, the diagnostic unit 41B compares the obtained machine information with the patch-related information to judge the presence of a machine requiring the application of the patch (step S13). If such a machine is present, the machine is selected.

Next, it is judged by referencing a patch application database 42B whether or not it contains information specifying the patch application (or a forbidden item in terms of the patch application) (step S14). If it is judged that the patch can be applied without any problem (if YES at step S14), a patch application unit 451 applies the patch to the target machine according to the instruction from the diagnostic unit 41B (step S15). At the same time, if filtering rules to be executed by a rule execution unit 443 have been registered in a rule database 452, a filtering rule 41b related to the relevant patch is deleted (step S16).

After the patch application, the machine operation confirmation is made to verify that the operation of the patched machine is the same as that before the patch application. The confirmation may be performed in the diagnostic unit 41B by obtaining operation information as information related to the machine information. Alternatively, the confirmation may be made in the recovery system shown in FIGS. 1 and 2 or in the network monitor shown in FIG. 2. Specific examples of the confirmation method are as follows.

(1) Confirmation of a Process

This is performed, for example, by judging whether or not a software program is running.

(2) Confirmation using Services or Software

If the target machine is a Web server, for example, the confirmation can be made by judging whether or not its page is being displayed. If the target machine is a mail server, the confirmation can be made by judging whether or not transmission or reception of mails is available.

(3) Confirmation of Intrinsic Settings

If the target machine is a firewall, for example, the confirmation can be made by judging whether or not it is able to reject a packet. If the target machine is a mail server, the confirmation can be made by judging whether or not illegal relay is being performed.

(4) Other Confirmation

For example, the confirmation can be made by performing operation confirmation using the profile of the machine (this will be described later in connection with the third embodiment). For example, a database containing profiles is prepared in advance, and computer process and network logs for a predetermined period of past time (e.g. one month) are stored in the profile database. Logs obtained after the patch application are compared with those stored in the profile database to check out differences, thereby judging whether or not the machine operation is the same as that before the patch application.

If the machine operation is judged to be abnormal in the above-described confirmation, the recovery system or the patch application unit 451 performs processing for deleting the patch.

In the foregoing arrangement, the preventive execution unit 44B comprising the patch application unit 451, the rule database 452 and the rule execution unit 443 corresponds to the preventive execution unit 44 in FIG. 2.

Third Embodiment

Figure 8:
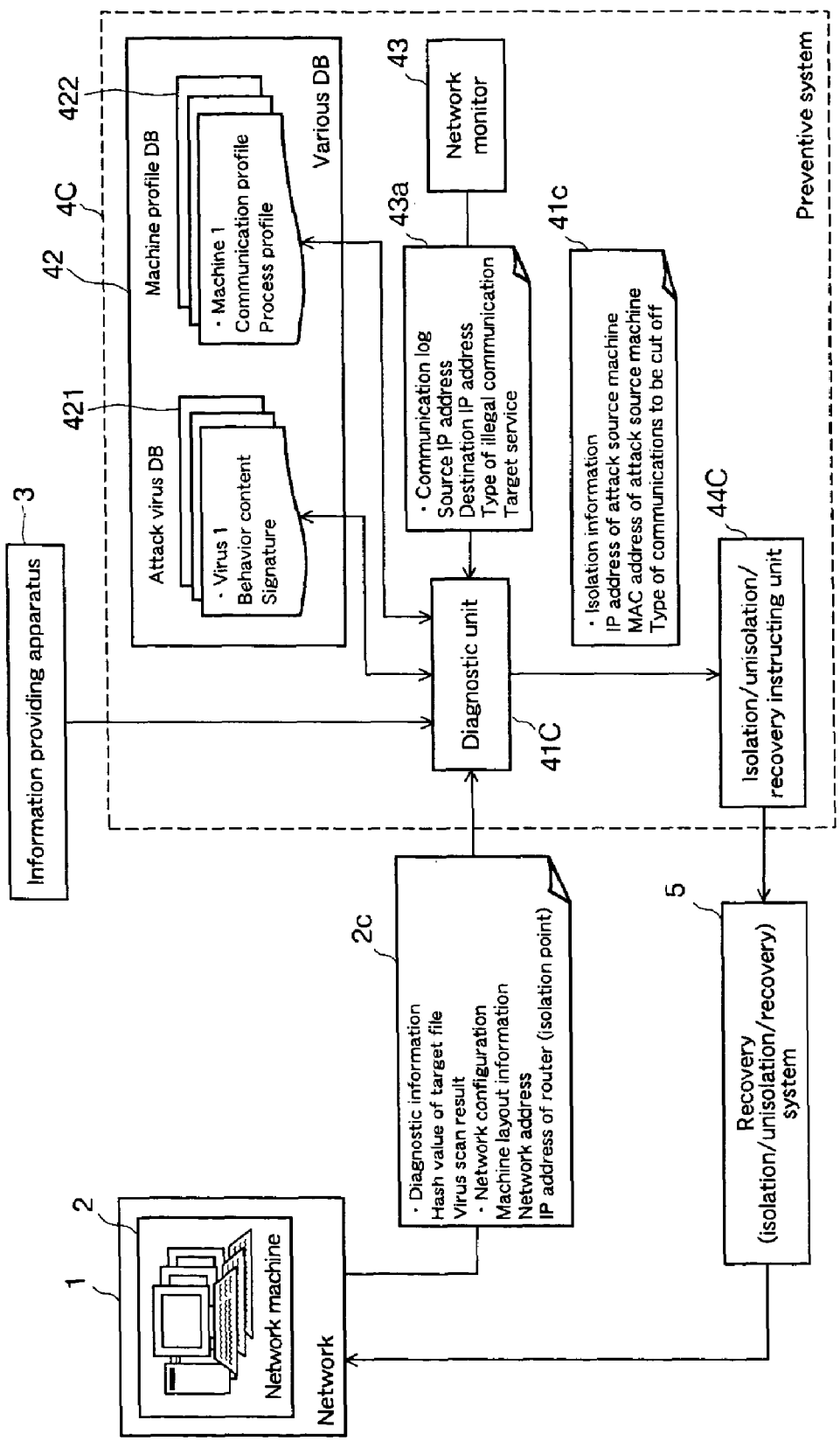
FIG. 8 is a block diagram showing a third embodiment of the present invention.
Figure 9:
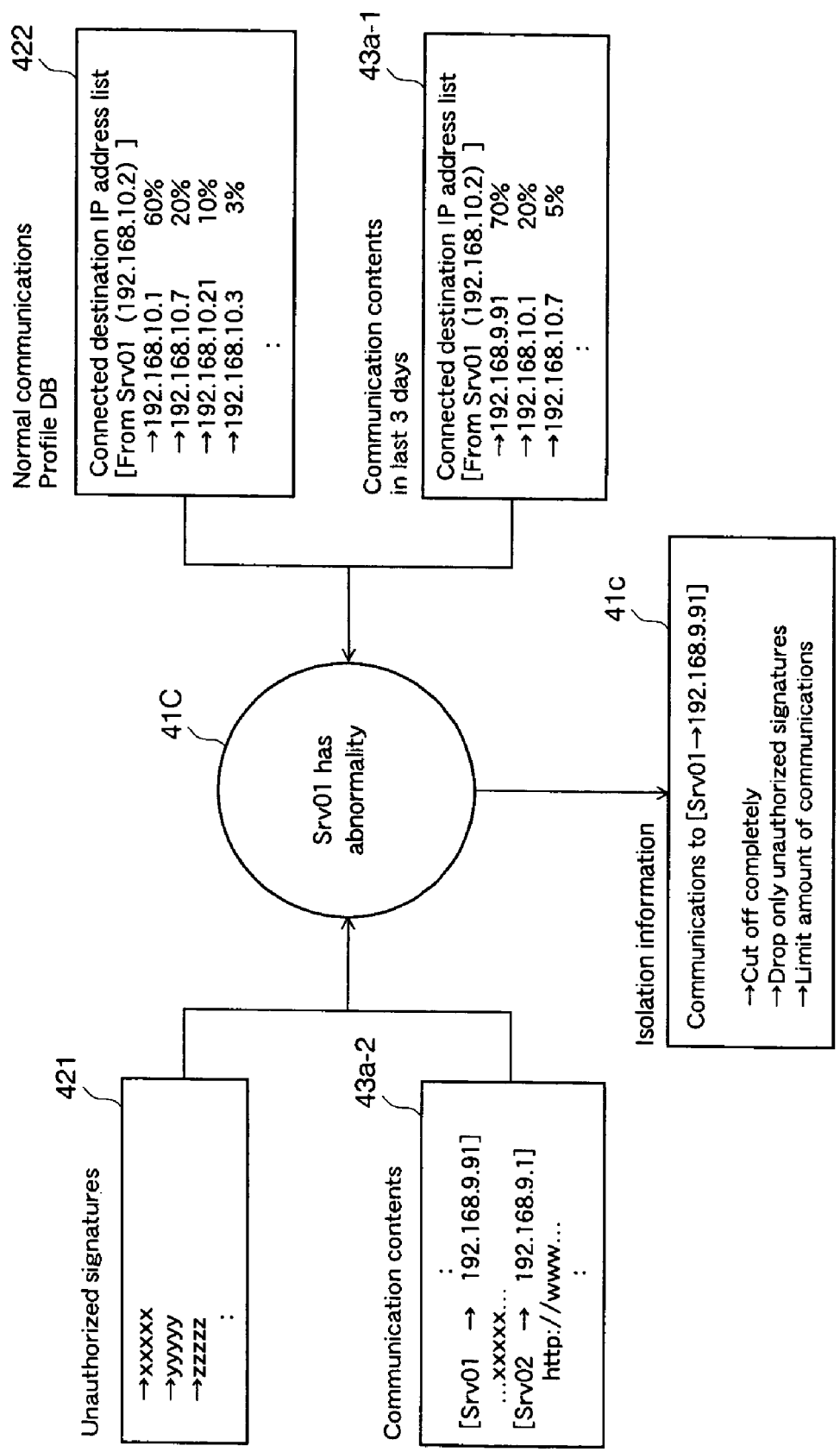
FIG. 9 is a conceptual view showing an operation of judging whether or not there is damage in the third embodiment of the present invention.
Figure 10:
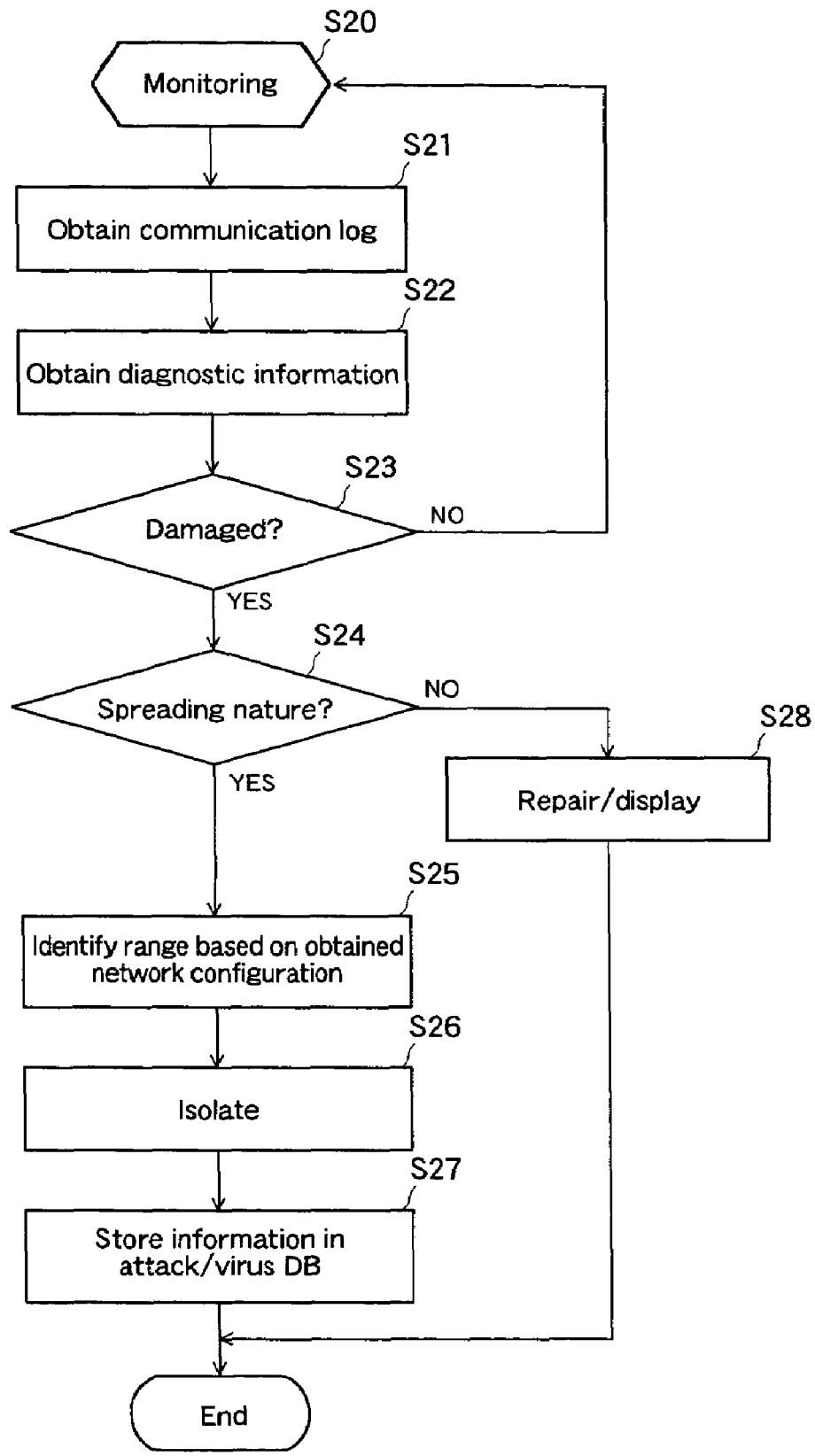
FIG. 10 is a flowchart showing the operation of the third embodiment of the present invention.

FIG. 8 is a block diagram showing a third embodiment of the present invention. FIG. 9 is a conceptual view showing an operation of judging whether or not there is damage. FIG. 10 is a flowchart showing the operation of the third embodiment.

In the following third embodiment, security measures are taken on the basis of a result of judging whether or not there is damage on the basis of communication logs of network machines and the behavior thereof.

In the third embodiment, the diagnostic unit 41C monitors communications or the machine behavior through the network monitor 43 (step S20), and obtains from the monitor contents a communication log 43a of information such as source IP addresses, destination IP addresses, types of illegal communications, and target services (step S21). From the network machines 2, the diagnostic unit 41C obtains diagnostic information, such as the hash value of the target file and virus scan result, as machine information 2c (step S22). Then, the diagnostic unit 41C compares the communication log 43a and the machine information 2c with information concerning the behavior contents and signatures of viruses, etc. registered in an attack (backdoor)/virus database 421 or compares them with communication profiles and process files registered in a machine profile database 422 to judge whether or not there are damaged machines (step S23). If it is judged that there are damaged machines (if YES at step S23), a judgment is made as to whether or not the damage has spreading nature (step S24). The judgment of the damage spreading nature is made simultaneously with the estimation of damaged machines and the scale of damage. For example, the damage spreading nature can be judged by monitoring the change with time of the number or range of damaged machines. If it is judged that the damage has spreading nature (if YES at step S24), the damage range is identified (step S25).

Further, if it is judged that the damage has spreading nature, the diagnostic unit 41C obtains network information (machine layout information, network configuration, IP address of isolation point, etc.) from each network machine as machine information to determine the isolation point, and delivers isolation information (IP address of attack source, MAC address of attack source, type of communications to be cut off, etc.) 41c for the isolation instruction to an isolation/unisolation/recovery instructing unit (preventive execution unit) 44C (step S26). It should be noted that the term "isolation" as used herein means regulating transmission from a network machine. In this case, the term "isolation" further includes permitting only predetermined communications (remote source and amount of data) and cutting off communications to an unauthorized destination as illegal communications. In the example shown in FIG. 4, the isolation point is determined by specifying one of the isolating devices.

Upon receiving the isolation information, the isolation/unisolation/recovery instructing unit (preventive execution unit) 44C transmits an isolation instruction based on the isolation information to the recovery system 5. The recovery system 5 instructs a router (one of the isolating devices 12 to 15) serving as an isolation point to perform an isolating operation. In response to the instruction from the recovery system 5, the router restricts communications at the isolation point. The communication control is monitored by the network monitor 43, for example. At the diagnostic unit 41C, a confirmation unit (not shown) confirms that the damaged machines have been isolated on the basis of the obtained communication logs, etc. Thereafter, the recovery system 5 can recover the damaged machines from the predetermined damage. The arrangement may be such that when such damage occurs, the user is informed of the occurrence of the damage. In addition, the diagnostic unit 41C stores information concerning the phenomenon causing the new damage, etc., e.g. unauthorized signature, into the attack/virus database 421 (step S27). The new information stored in the database 421 can be provided to security-managing information providing apparatus and preventive systems in other networks through a communications circuit, for example, so that it is usable as information for quickly taking preventive measures.

The recovery processing executed by the recovery system 5 includes processing in which when set values of registers, etc. have been changed owing to damage, for example, the affected registers, etc. are restored to the normal state (e.g. default values) before they were damaged. The recovery processing further includes processing in which if it is judged that there is a part left unpatched, the patch application is newly executed for this part. It is also possible to delete a file that has been damaged or may cause damage. Further, it is possible to restart the system or to restore the system to the previous state by using a backup file (i.e. reinstallation).

If it is judged that the damage does not have spreading nature (if NO at step S24), the diagnostic unit 41C delivers information concerning the damage to the isolation/unisolation/recovery instructing unit (preventive execution unit) 44C to repair or display the damage (step S28). The isolation/unisolation/recovery instructing unit 44C transmits a recovery instruction to the recovery system 5. If the damage is repairable, the recovery system 5 repairs it. Further, the recovery system 5 notifies the owners of the network machines 2 of the repair of the damage.

FIG. 9 is a diagram showing in more detail the operation of judging whether or not there is damage by judging the presence of abnormality. In the case of damage caused by a known virus, for example, abnormality in the communication contents can be judged from the information stored in the attack/virus database 421 and the communication log 43a. In the case of FIG. 9, as an unauthorized signature, for example, "xxx" appears on the machine of machine name "Srv01" in communication contents 43a-2. Thus, it is possible to judge that the relevant machine has been damaged by a virus. It is also possible to judge from the history of the communication contents that the damage has spreading nature if the number of damaged machines increases with time. Regarding damage caused by an unknown virus or the like, the history of communication contents is compared with a normal communication profile stored in the machine profile database 422, and if the history is observed to be different from the normal communication profile, it is possible to judge that there has been some damage. A criterion for the judgment may be set as follows. For example, a rule is established for quantifying the difference between the distribution ratio 43a-1 of various connected destination addresses in all communications (transmissions) made in a predetermined period of time and the distribution ratio 422 in the normal profile, and if the difference exceeds a predetermined value, abnormality is judged to be present.

In FIG. 9, the two distribution ratios are different from each other. Therefore, it is possible to judge that there is abnormality in the machine subjected to the comparison. If it is judged from the history of communication contents that the number of machines having such abnormality is increasing, it is possible to judge that the damage has spreading nature. Therefore, isolation information for the damaged machines is delivered from the diagnostic unit. For the isolation information, for example, the following modes are prepared: A complete isolation mode of cutting off all transmissions from the relevant machine or a network segment including the machine; a drop mode of dropping only unauthorized signatures; and a communication quantity limiting mode of limiting the amount of communications.

Thus, the third embodiment can protect the network (machines) from not only known attack (backdoor) viruses but also unknown attacks. In addition, the third embodiment allows information obtained with respect to unknown attacks to be used also in security systems in other networks.

It should be noted that in the third embodiment the isolation/unisolation/recovery instructing unit 44C constitutes the preventive execution unit 44 shown in FIG. 2.

Fourth Embodiment

Figure 11:
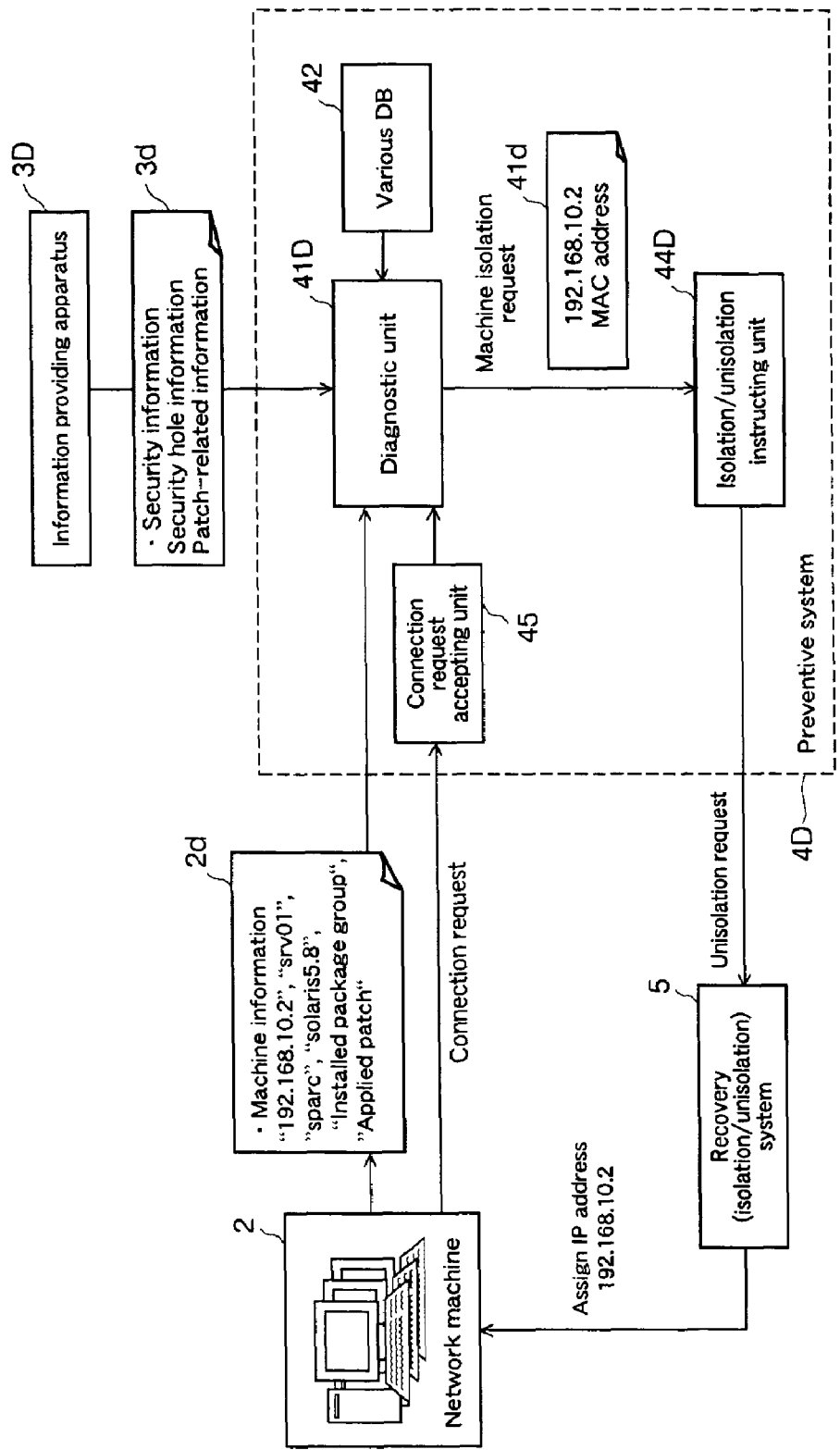
FIG. 11 is a block diagram showing a fourth embodiment of the present invention.
Figure 12:
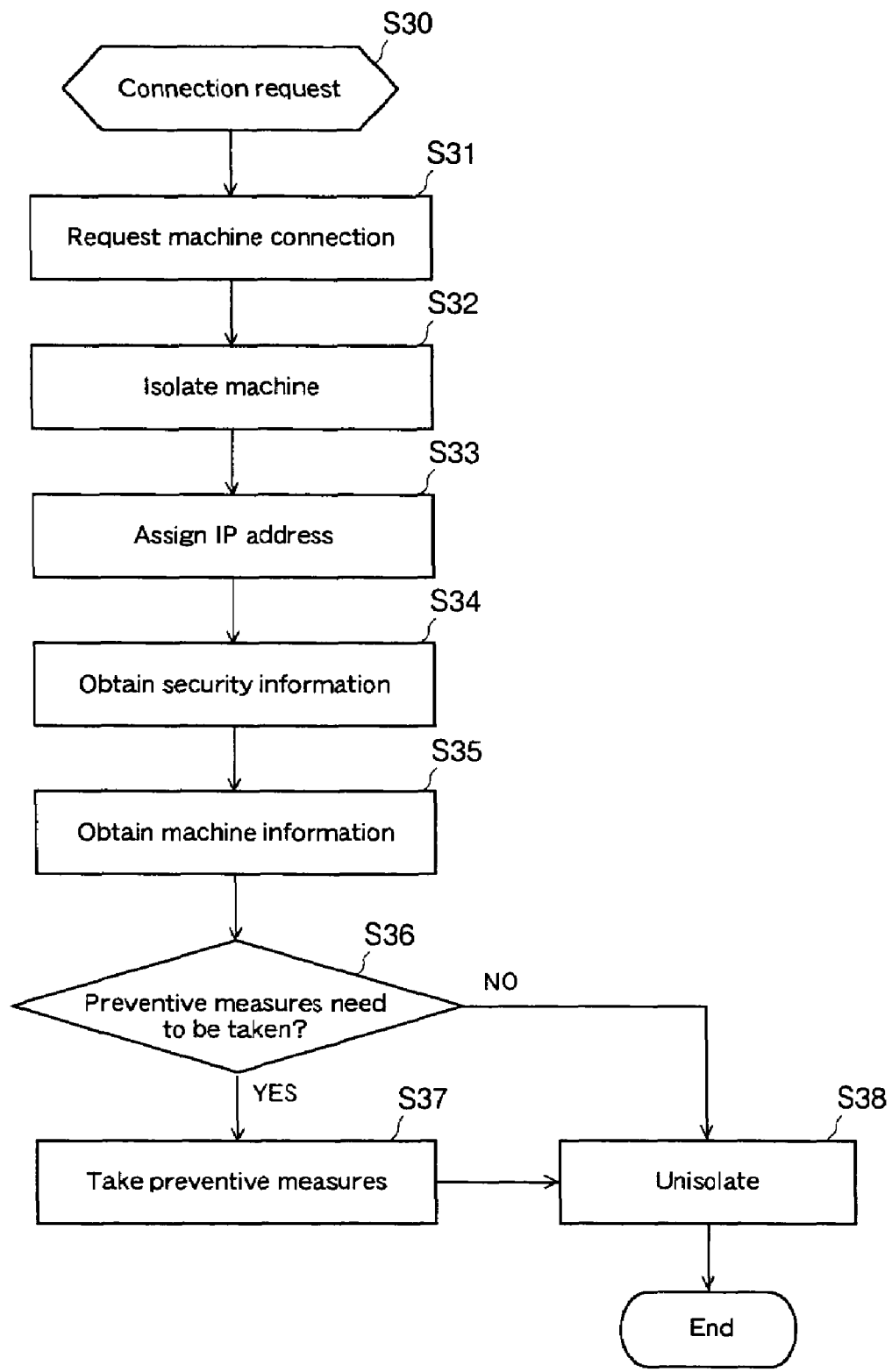
FIG. 12 is a flowchart showing the operation of the fourth embodiment of the present invention.

FIG. 11 is a block diagram showing a fourth embodiment of the present invention. FIG. 12 is a flowchart showing the operation of the fourth embodiment.

The fourth embodiment describes a case where a new network machine 2 is connected to the network under security management.

In the fourth embodiment, when a new network machine 2 is connected to the network under security management, a network including the relevant network machine 2 is isolated in the form of the smallest segment for the time being on the basis of an IP address to be given to the network machine 2 or the MAC address of the network machine 2. Thereafter, the IP address is given to the relevant machine 2. After preventive measures have been executed for the machine 2 or after the security of the machine 2 in the network has been confirmed and ensured, the machine 2 is released from the isolation.

That is, the preventive system 4D has a connection request accepting unit 45 for accepting a connection request when a new network machine 2 is installed in the network. When a connection request is issued (step S31), the diagnostic unit 41D instructs the recovery system 5 to execute isolation through an isolation/unisolation instructing unit 44D (step S32). When the new network machine 2 has been placed under its control, the recovery system 5 operates one of the isolating devices shown in FIG. 4 to effect isolation. After the execution of the isolation, the diagnostic unit 41D gives the machine 2 an IP address and a MAC address (step S33). After the IP address and so forth have been given, the diagnostic unit 41D obtains security hole information and patch-related information from the information providing apparatus 3D as security information 3d (step S34), and further obtains machine information 2d from the network machine 2 (step S35) to ensure security.

The above-described operation is the same as that shown in the first and second embodiments. That is, if the machine information contains those corresponding to the security hole information or the patch-related information obtained from the information providing apparatus (if YES at step S36), the filtering database (42A in FIG. 1) or the patch application database (42B in FIG. 6) is searched to create a filtering rule or perform a patch application operation appropriately, thereby taking preventive measures for the new network machine (step S37). After the security of the new network machine has been ensured in this way, or if the machine information concerning the new network machine contains no information corresponding to the security hole information or the patch-related information and thus it is judged that there is no need to ensure security (if NO at step S36), the isolation/unisolation instructing unit 44D is directed to issue an unisolation instruction (step S38), thereby allowing the recovery system 5 to cancel the isolating operation of the isolating device.

In the fourth embodiment, the, isolation/unisolation instructing unit 44D constitutes the preventive execution unit 44 shown in FIG. 2.

Fifth Embodiment

Figure 13:
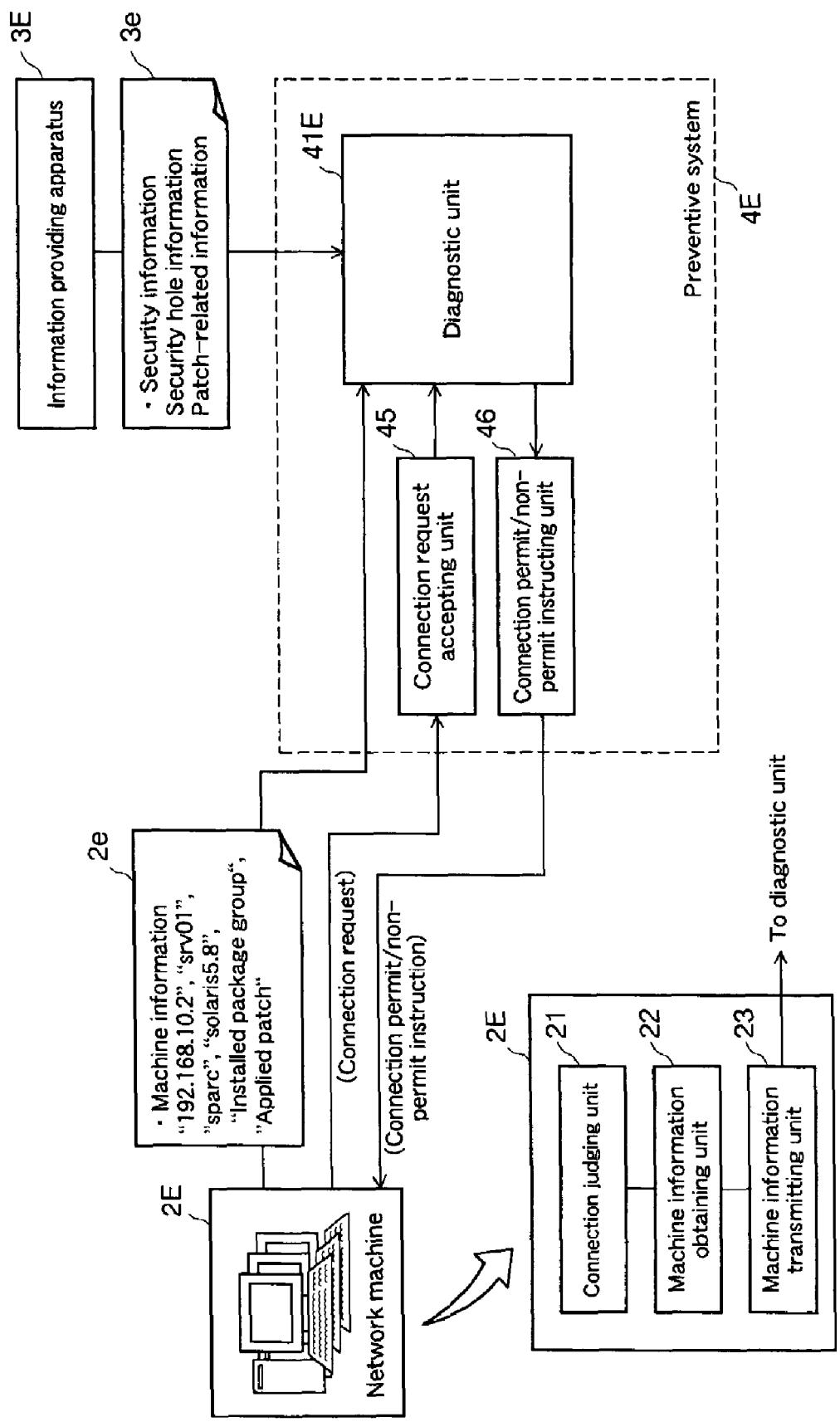
FIG. 13 is a block diagram showing a fifth embodiment of the present invention.
Figure 14:
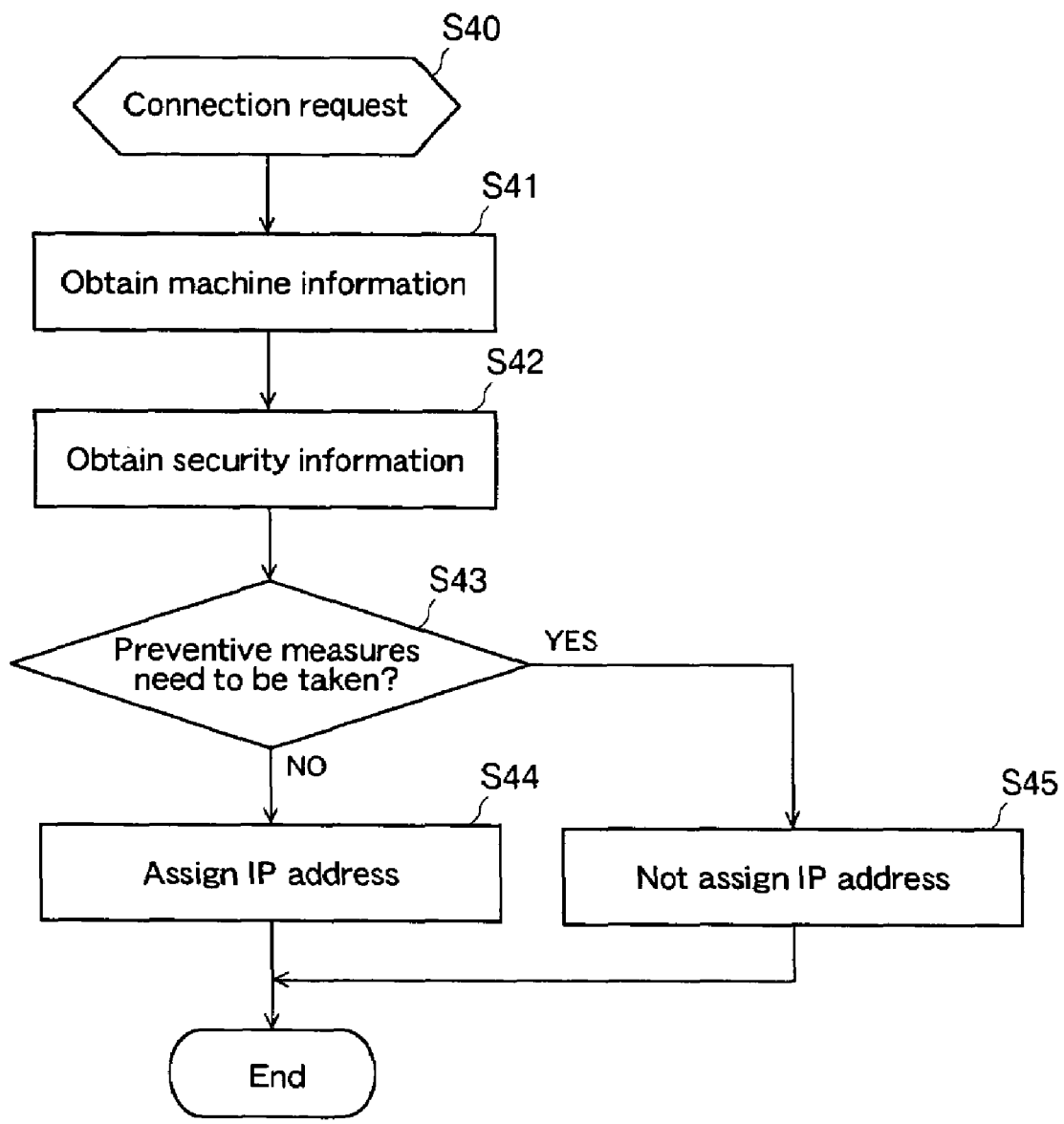
FIG. 14 is a flowchart showing the operation of the fifth embodiment of the present invention.

FIG. 13 is a block diagram showing a fifth embodiment of the present invention. FIG. 14 is a flowchart showing the operation of the fifth embodiment.

The fifth embodiment describes a case where a new network machine 2E that is going to be connected to the network under security management has been installed with the function of transmitting machine information without an IP address by utilizing broadcasting, for example.

In the fifth embodiment, when the new network machine 2E is connected to the network under security management, the preventive system 4E obtains machine information from the machine 2E and downloads security information (security hole information, patch-related information, etc.) from the information providing apparatus 3E to judge whether or not preventive measures need to be taken. If it is judged that there is no need to take preventive measures, the preventive system 4E gives an IP address to the network machine 2E and permits it to be connected to the network.

That is, the preventive system 4E has a connection request accepting unit 45 and a connection permit/non-permit instructing unit 46. When the connection request accepting unit 45 accepts a connection request from the network machine 2E (step S40), the diagnostic unit 41E obtains machine information 2e from the network machine 2E (step S41). Then, the diagnostic unit 41E further obtains security information 3e from the information providing apparatus 3E (step S42) and compares the security information 3e with the machine information 2e. If it is judged that the security level is high and hence there is no need to take preventive measures (if NO at step S43), the diagnostic unit 41E gives an IP address to the network machine 2E (step S44).

If it is judged that the security level is not high and hence preventive measures need to be taken (if YES at step S43), no IP address is given (step S45) to the network machine 2E. In this case, the process shifts to the operation of the fourth embodiment, whereby preventive processing is carried out. Then, an IP address is given to the network machine 2E.

It should be noted that the network machine 2E in this case has the following units: a connection judging unit 21 for judging that the network machine 2E has been connected to the network; a machine information obtaining unit 22 for obtaining machine information by collecting its own machine information when the connection judging unit 21 judges that the network machine 2E has been connected to the network; and a machine information transmitting unit 23 for transmitting the information obtained by the machine information obtaining unit 22, together with the connection request, to the preventive system 4E (diagnostic unit 41E).

Thus, in the fifth embodiment, in a case where a network machine to be connected has been installed with the function of transmitting machine information without an IP address, the network machine is given an IP address, etc. and permitted to be connected to the network after the security of the machine has been ensured, thereby ensuring the security of the network.

In the fifth embodiment, the connection permit/non-permit instructing unit 46 constitutes the preventive execution unit 44 shown in FIG. 2.

Sixth Embodiment

Figure 15:
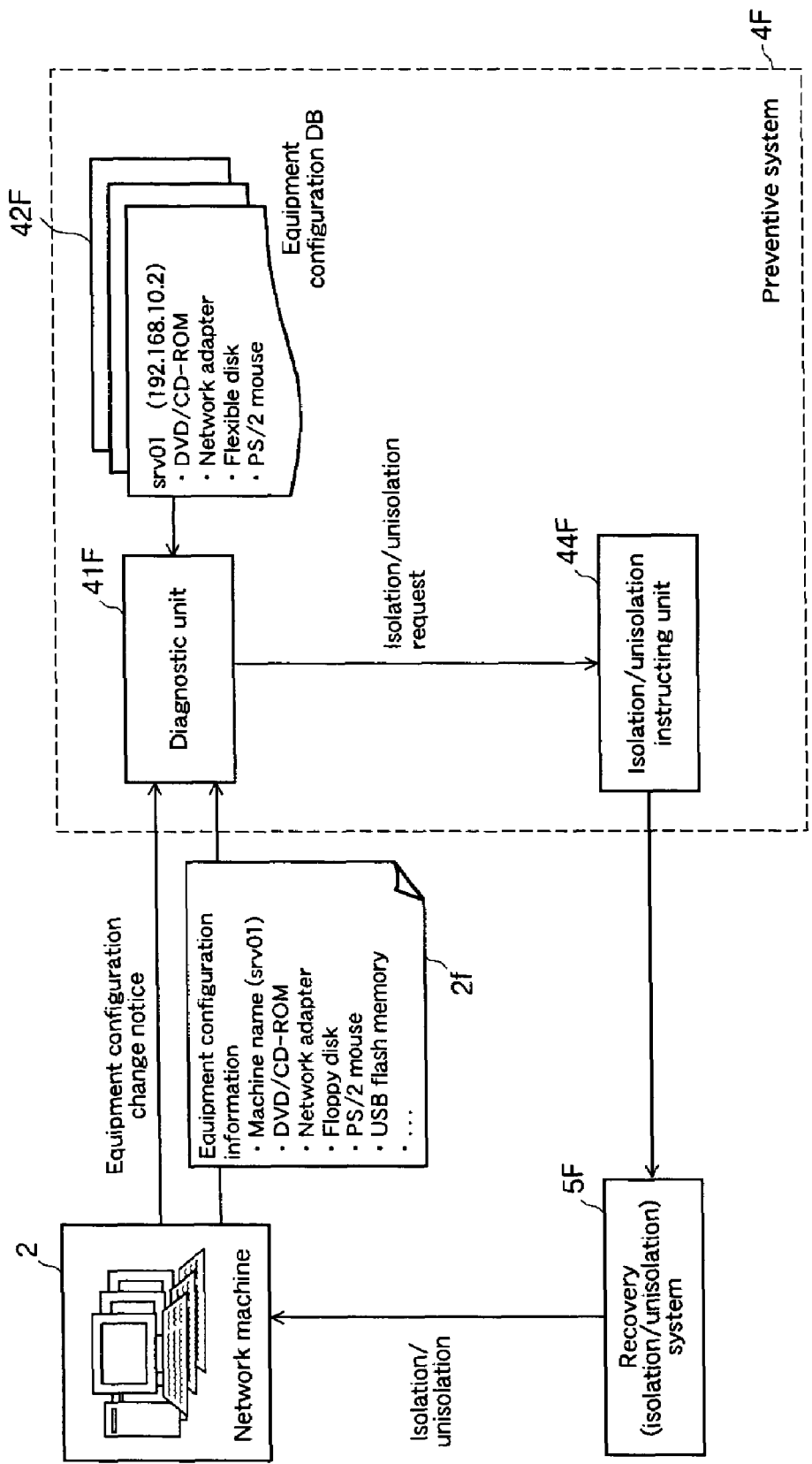
FIG. 15 is a block diagram showing a sixth embodiment of the present invention.
Figure 16:
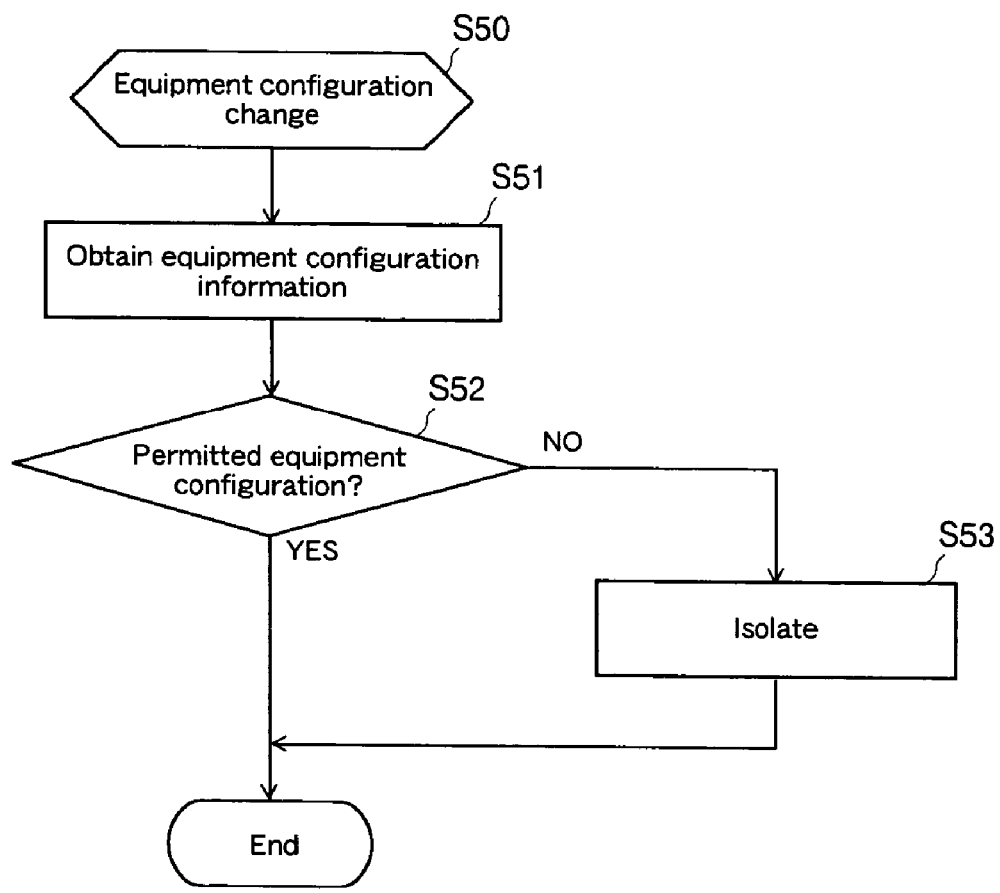
FIG. 16 is a flowchart showing the operation of the sixth embodiment of the present invention.

FIG. 15 is a block diagram showing a sixth embodiment of the present invention. FIG. 16 is a flowchart showing the operation of the sixth embodiment.

The sixth embodiment describes a case where a network machine 2 has previously been installed with the function of transmitting an equipment configuration change notice when the configuration of the machine 2 has been changed.

If such a network machine 2F undergoes a configuration change, it transmits an equipment configuration change notice to the diagnostic unit 41F (step S50). Upon receiving the equipment configuration change notice, the diagnostic unit 41F receives equipment configuration information 2*f* from the network machine 2F as information concerning the configuration of the equipment and reads equipment configuration information from an equipment configuration database 42F in which information has previously been registered concerning equipment configurations (including component parts) permitted to be used in machines in the network (step S51). The diagnostic unit 41F compares the equipment configuration information 2*f* with the read configuration information to verify whether or not the equipment configuration of the network machine 2F is one that is permitted to be used (step S52).

If the equipment configuration of the network machine 2F is a permitted one, the processing is terminated without isolating the network machine 2F. If the network machine 2F includes a configuration that is not permitted, the machine 2F is isolated (step S53).

The isolating processing is performed, for example, by notifying the recovery system 5F to execute isolating processing through the isolation/unisolation instructing unit 44F. In this embodiment, the network machine 2F is isolated when it is judged that it has an equipment configuration that is not permitted. However, the arrangement may be such that the network machine 2F is isolated immediately after the equipment configuration change notice has been received (step S50), and after it has been judged that the equipment configuration is a permitted one (step S52), the network machine 2F is released from the isolation.

The sixth embodiment can prevent damage that might be caused by a configuration change made to a network machine. It should be noted that the equipment configuration information 2*f* includes, for example, information concerning machine name, DVD/CD-ROM, network adapter, flexible disk, PS/2 mouse, USB flash memory, etc. The term "configuration change" as used herein includes not only addition but also removal of a constituent component.

In the sixth embodiment, the isolation/unisolation instructing unit 44F constitutes the preventive execution unit 44 shown in FIG. 2.

Seventh Embodiment

FIG. 18 shows a first example of assignment configuration of various systems as a seventh embodiment of the present invention.

In the example shown in FIG. 18, an information service provider (who has the information providing apparatus 3) 70 has the preventive system 4 and the recovery system 5 and serves also as a management service provider 71. The information service provider 70 obtains system information (client network information) 10 from a client network 72 and provides a patch and filtering rule 30 for each client network 72 by using its own security information.

Eighth Embodiment

Figure 19:
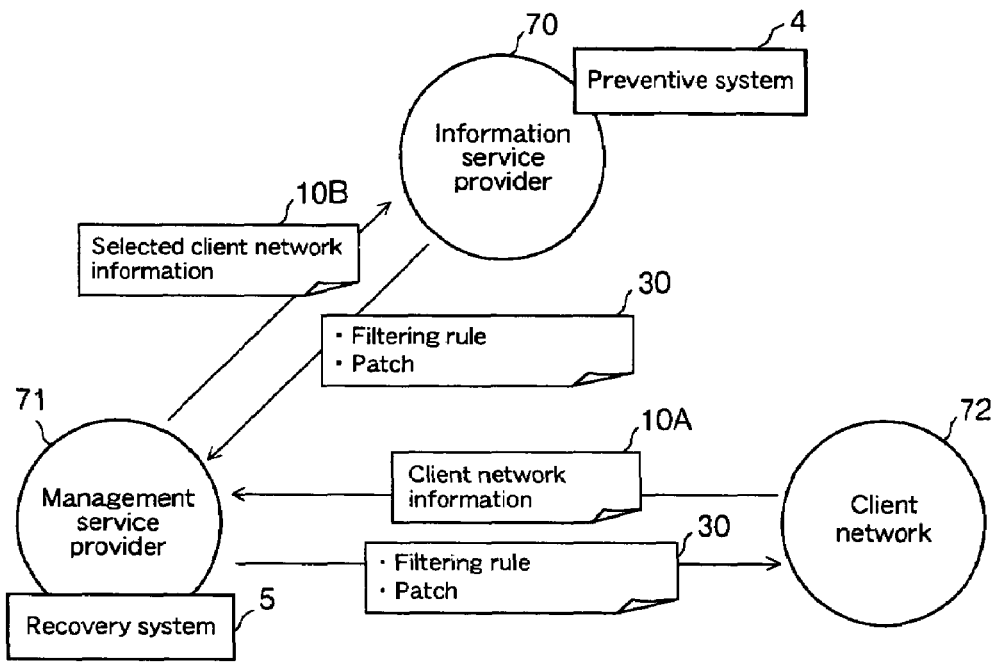
FIG. 19 is a diagram showing a second example of assignment configuration of various systems as an eighth embodiment of the present invention.

FIG. 19 shows a second example of assignment configuration of various systems as an eighth embodiment of the present invention.

In the example shown in FIG. 19, an information service provider 70 has the preventive system 4, and a management service provider 71 has the recovery system 5. The management service provider 71 obtains system information (client network information) 10A from a client network 72 and transmits only system information 10B required for the filtering rule and patch 30 to the information service provider 70. The information service provider 70 creates a patch and filtering rule 30 for each client network 72 by using its own security information and transmits the created patch and filtering rule 30 to the management service provider 71. The management service provider 71 provides the patch and filtering rule 30 to the client network 72.

Ninth Embodiment

Figure 20:
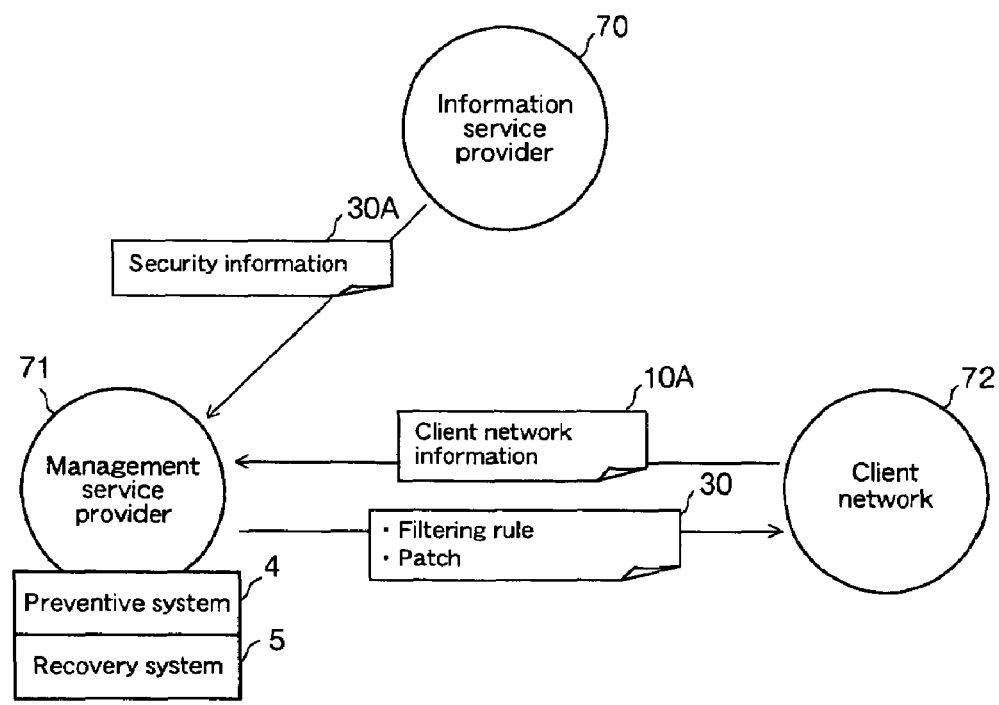
FIG. 20 is a diagram showing a third example of assignment configuration of various systems as a ninth embodiment of the present invention.

FIG. 20 shows a third example of assignment configuration of various systems as a ninth embodiment of the present invention.

In the example shown in FIG. 20, an information service provider 70 only transmits security information 30A. A management service provider 71 has the preventive system 4 and the recovery system 5. The management service provider 71 downloads security information 30A from the information service provider 70 and obtains system information (client network information) 10A from a client network 72. The management service provider 71 creates a patch and filtering rule 30 for each client network 72 and provides the created patch and filtering rule 30 to the client network 72.

Tenth Embodiment

FIG. 21 shows a fourth example of assignment configuration of various systems as a tenth embodiment of the present invention.

In the example shown in FIG. 21, one management service provider 71 obtains security information I2 from four information service providers 70 to restore a damaged client network A. Further, the management service provider 71 obtains information I1 concerning the damage from the client network A to use the information I1 for preventing damage to the other three client networks 1 (B to D) (i.e. damage information and preventive measure information can be fed back). Further, the management service provider 71 transmits the damage information I1 to the four information service providers 70 (A to D).

As has been detailed above, according to the embodiments of the present invention, even if a network system is damaged, the range of the damage can be identified easily by the cooperation of the preventive system, the recovery system and the information providing apparatus. Further, the isolation and repair of the damage are made by the recovery system (diagnostic unit), thereby making it possible to minimize the damage and to repair predetermined damage automatically and quickly. Further, because information concerning the damage can be stored and reused, it is also possible to prevent the same damage from occurring at a difference place. Further, not only a patch is applied to a target machine, but also operation confirmation is automatically made to the patched machine. Thus, it is also possible to verify that the operation of the patched machine is the same as that before the patch application. Accordingly, the present invention is extremely useful for security measures. Further, information from many information service providers can be orderly provided to client networks. Accordingly, troublesomeness in information processing at the client side is reduced favorably.

As has been detailed above, it is possible according to the present invention to provide a security management apparatus, a security management system, a security management method, and a security management program that are capable of obtaining machine information from network machines constituting a network and of taking various security measures while referencing the machine information and hence excellent in flexibility and widely applicable.

It should be noted that the present invention is not necessarily limited to the foregoing embodiments but can be modified in a variety of ways without departing from the gist of the present invention.

What is claimed is:

1. A security management apparatus comprising:
   a security diagnostic unit for making a security diagnosis on a basis of security information obtained from a security information providing unit for providing information concerning security in a network and further on a basis of machine information obtained from at least one network machine connected to a network to judge a type of security-related processing to be executed for said network machine or a predetermined network including said network machine and also judge whether or not the security-related processing needs to be executed; and
   a security execution unit for executing predetermined security measure processing for said network machine or the predetermined network including said network machine on a basis of a result of diagnosis made by said security diagnostic unit, and a connection request accepting unit for accepting a connection request from a newly introduced network machine; wherein when said connection request accepting unit accepts a connection request from a newly introduced network machine, said security diagnostic unit assigns an address to said newly introduced network machine after placing it in an isolated state and judges whether or not to execute processing for unisolating said newly introduced network machine as said security related processing on a basis of said machine information and said security information.

2. A security management apparatus according to claim 1, wherein said security diagnostic unit further uses machine-related information obtained from a machine-related information storage unit containing predetermined information about network machines that are connected to said network or may be connected to said network to judge a type of security-related processing to be executed for said network machine or the predetermined network including said network machine and also judge whether or not the security-related processing needs to be executed.

3. A security management apparatus according to claim 2, wherein the machine-related information stored in said machine-related information storage unit is information specifying a security policy.

4. A security management apparatus according to claim 1, wherein
   said security diagnostic unit receives machine information from said newly introduced network machine and judges whether or not to execute processing for assigning the address to said newly introduced network machine as said security-related processing on a basis of said machine information and said security information.

* * * * *